US009703382B2

(12) United States Patent
Yamada et al.

(10) Patent No.: US 9,703,382 B2
(45) Date of Patent: Jul. 11, 2017

(54) DEVICE, METHOD, AND STORAGE MEDIUM STORING PROGRAM WITH CONTROL FOR TERMINATING A PROGRAM

(75) Inventors: Hidekatsu Yamada, Yokohama (JP); Yoshiyuki Shinoda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 248 days.

(21) Appl. No.: 13/597,650

(22) Filed: Aug. 29, 2012

(65) Prior Publication Data

US 2013/0055160 A1 Feb. 28, 2013

(30) Foreign Application Priority Data

Aug. 29, 2011 (JP) ................ 2011-186638
Aug. 28, 2012 (JP) ................ 2012-188102
Aug. 28, 2012 (JP) ................ 2012-188103

(51) Int. Cl.
*G06F 3/01* (2006.01)
*G06F 3/0482* (2013.01)
*G06F 3/0484* (2013.01)
*G06F 3/0488* (2013.01)

(52) U.S. Cl.
CPC ............ *G06F 3/017* (2013.01); *G06F 3/0482* (2013.01); *G06F 3/0484* (2013.01); *G06F 3/04883* (2013.01)

(58) Field of Classification Search
CPC ............ G06F 3/04883; G06F 3/04817; G06F 3/0482; G06F 3/0484; G06F 3/04842; G06F 3/0488; G06F 3/04886
USPC .................................................. 715/779
See application file for complete search history.

(56) References Cited

U.S. PATENT DOCUMENTS

| 7,957,762 | B2* | 6/2011 | Herz et al. ................. 455/550.1 |
| 8,015,509 | B2* | 9/2011 | Karstens ....................... 715/866 |
| 8,339,497 | B2  | 12/2012 | Iwase et al. |
| 8,413,065 | B2* | 4/2013 | Horodezky .................. 715/772 |
| 8,769,443 | B2* | 7/2014 | King et al. ................... 715/863 |
| 9,244,606 | B2* | 1/2016 | Kocienda ............ G06F 3/04883 |
| 2004/0174398 | A1* | 9/2004 | Luke ..................... G06F 3/0481 715/856 |
| 2006/0010397 | A1* | 1/2006 | Laffey .................. G06F 3/0481 715/808 |

(Continued)

FOREIGN PATENT DOCUMENTS

| CN | 102063253 A | 5/2011 |
| JP | 2009-9356 A | 1/2009 |
| JP | 2009-76004 A | 4/2009 |
| JP | 2010-55454 A | 3/2010 |
| WO | 2008086302 A1 | 7/2008 |
| WO | 2011/099803 A2 | 8/2011 |

OTHER PUBLICATIONS

"Window Locking." Mar. 1, 2002. IBM Technical Disclosure Bulletin. pp. 517.*

(Continued)

*Primary Examiner* — Kieu Vu
*Assistant Examiner* — Blaine Basom
(74) *Attorney, Agent, or Firm* — Hauptman Ham, LLP

(57) ABSTRACT

According to an aspect, a device includes a touch screen display and a controller. The touch screen display displays an object corresponding to either an application in execution or an application terminated. The controller erases the object when a flick gesture with respect to the object is detected through the touch screen display.

22 Claims, 16 Drawing Sheets

(56) References Cited

U.S. PATENT DOCUMENTS

| | | | |
|---|---|---|---|
| 2007/0024646 A1* | 2/2007 | Saarinen | G06F 3/0485 345/660 |
| 2008/0165160 A1 | 7/2008 | Kocienda et al. | |
| 2008/0189708 A1* | 8/2008 | Cheng | G06F 9/542 718/102 |
| 2009/0002735 A1 | 1/2009 | Higashiura | |
| 2009/0088204 A1* | 4/2009 | Culbert et al. | 455/556.1 |
| 2009/0172594 A1 | 7/2009 | Chen | |
| 2010/0162179 A1* | 6/2010 | Porat | 715/863 |
| 2011/0197153 A1 | 8/2011 | King et al. | |
| 2011/0202872 A1* | 8/2011 | Park | 715/790 |
| 2011/0252363 A1* | 10/2011 | Tsuda | G06F 3/0483 715/788 |
| 2011/0252380 A1* | 10/2011 | Chaudhri | 715/836 |
| 2012/0030628 A1* | 2/2012 | Lee et al. | 715/835 |
| 2012/0084690 A1* | 4/2012 | Sirpal et al. | 715/769 |
| 2013/0047079 A1* | 2/2013 | Kroeger et al. | 715/273 |
| 2013/0050269 A1* | 2/2013 | Arrasvuori | 345/661 |

OTHER PUBLICATIONS

Office Action mailed Apr. 7, 2015, corresponding to Japanese patent application No. 2012-188102, for which an explanation of relevance is attached.

Office Action mailed Apr. 7, 2015, corresponding to Japanese patent application No. 2012-188103, for which an explanation of relevance is attached.

Office Action mailed Aug. 4, 2015, corresponding to Japanese patent application No. 2012-188103, for which an explanation of relevance is attached.

"AppSwipe! v2 (task switcher)", the quickest application switching tool! Allowing immediate grasp of conditions, [online], Jan. 30, 2011, retrieved from Internet on Jul. 31, 2015, <URL: http://andronavi.com/2011/01/67630>, for which a partial translation is attached.

"Itching Thumb", the most powerful tool for task management, [online], Feb. 3, 2011, retrieved from Internet on Jul. 31, 2015, <URL:https://web.archive.org/web/20110203082547/http://initial-m.net/articles/1_mobile/androidapp/itchingthumb.html>, for which a partial translation is attached.

"Itching Thumb the ultimate task manager for Android", [online], Oct. 22, 2010, retrieved from Internet on Jul. 31, 2015, <URL:https://www.youtube.com/watch?v=kNaCQjSUbwM>.

Office Action mailed Aug. 11, 2015, corresponding to Japanese patent application No. 2012-188102, for which an explanation of relevance is attached.

Office Action mailed on Oct. 27, 2015, corresponding to Japanese Patent Application No. 2012-188103, for which an explanation of relevance is attached.

\* cited by examiner

FIG.6

| APP. NAME \ ITEM | DOWNLOADED DATE | LAST EXECUTED DATE | NUMBER OF EXECUTION TIMES IN LAST ONE MONTH | ... | GROUP |
|---|---|---|---|---|---|
| Browser | 201X/1/3 8:00 | 201X/7/11 16:00 | 576 | ... | COMMUNICATION |
| Calculator | 201X/4/2 10:00 | 201X/6/30 17:00 | 15 | ... | UTILITIES |
| Calendar | 201X/6/25 19:00 | 201X/7/7 23:00 | 143 | ... | UTILITIES |
| Camera | 201X/10/5 14:00 | 201X/6/29 15:00 | 392 | ... | ENTERTAINMENT |
| ⋮ | ⋮ | ⋮ | ⋮ | ⋮ | ⋮ |
| Clock | 201X/1/3 8:00 | 201X/5/18 23:00 | 67 | ... | UTILITIES |
| Mail | 201X/1/3 8:00 | 201X/7/11 17:00 | 445 | ... | COMMUNICATION |
| Music | 201X/1/10 0:00 | 201X/7/11 19:00 | 79 | ... | ENTERTAINMENT |
| ⋮ | ⋮ | ⋮ | ⋮ | ⋮ | ⋮ |
| Phone | 201X/1/3 8:00 | 201X/7/11 23:00 | 290 | ... | COMMUNICATION |
| Photos | 201X/5/18 7:00 | 201X/6/19 19:00 | 142 | ... | ENTERTAINMENT |
| Settings | 201X/1/3 8:00 | 201X/4/29 3:00 | 77 | ... | OTHER |
| SMS | 201X/4/23 13:00 | 201X/7/11 21:00 | 301 | ... | ENTERTAINMENT |
| Weather | 201X/3/15 11:00 | 201X/7/10 22:00 | 150 | ... | NEWS |

DEVICE, METHOD, AND STORAGE MEDIUM STORING PROGRAM WITH CONTROL FOR TERMINATING A PROGRAM

CROSS-REFERENCE TO RELATED APPLICATIONS

This application claims priority from Japanese Application No. 2011-186638, filed on Aug. 29, 2011, Japanese Application No. 2012-188102, filed on Aug. 28, 2012, and Japanese Application No. 2012-188103, filed on Aug. 28, 2012, the contents of which are incorporated by reference herein in their entireties.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

The touch screen device is configured to execute an application program (hereinafter, also referred to as "application"). The touch screen device is also configured to terminate an application in execution.

There is a need for a device, a method, and a program that improve the operability.

SUMMARY

According to an aspect, a device includes a touch screen display and a controller. The touch screen display displays an object corresponding to a program in execution. The controller terminates the program corresponding to the object when a gesture with respect to the object is detected through the touch screen display.

According to another aspect, a method is for controlling a device including a touch screen display. The control method includes: displaying an object corresponding to a program in execution on the touch screen display; detecting a gesture with respect to the object through the touch screen display; and terminating the program corresponding to the object upon the detecting.

According to another aspect, a non-transitory storage medium stores a program. When executed by a device including a touch screen display, the program causes the device to execute: displaying an object corresponding to a program in execution on the touch screen display; detecting a gesture with respect to the object through the touch screen display; and terminating the program corresponding to the object upon the detecting.

According to another aspect, a device includes a touch screen display and a controller. The touch screen display displays an object corresponding to either an application in execution or an application terminated. The controller erases the object when a flick gesture with respect to the object is detected through the touch screen display.

According to another aspect, a method is for controlling a device including a touch screen display. The control method includes: displaying an object corresponding to either an application in execution or an application terminated on the touch screen display; and erasing the object when a flick gesture with respect to the object is detected through the touch screen display.

According to another aspect, a non-transitory storage medium stores a program. When executed by a device including a touch screen display, the program causes the device to execute: displaying an object corresponding to either an application in execution or an application terminated on the touch screen display; and erasing the object when a flick gesture with respect to the object is detected through the touch screen display.

BRIEF DESCRIPTION OF THE DRAWINGS

FIG. 6 is a diagram illustrating an example of the contents stored in a table;

DETAILED DESCRIPTION

Exemplary embodiments of the present invention will be explained in detail below with reference to the accompanying drawings. A smartphone will be explained below as an example of a device provided with a touch screen display.

Figure 1:
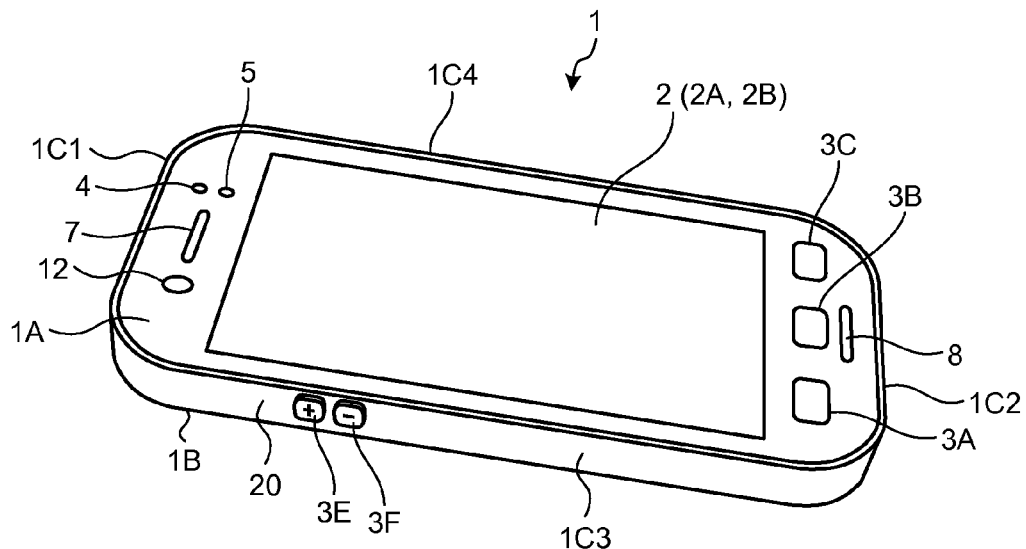
FIG. 1 is a perspective view of a smartphone according to a first embodiment.
Figure 2:
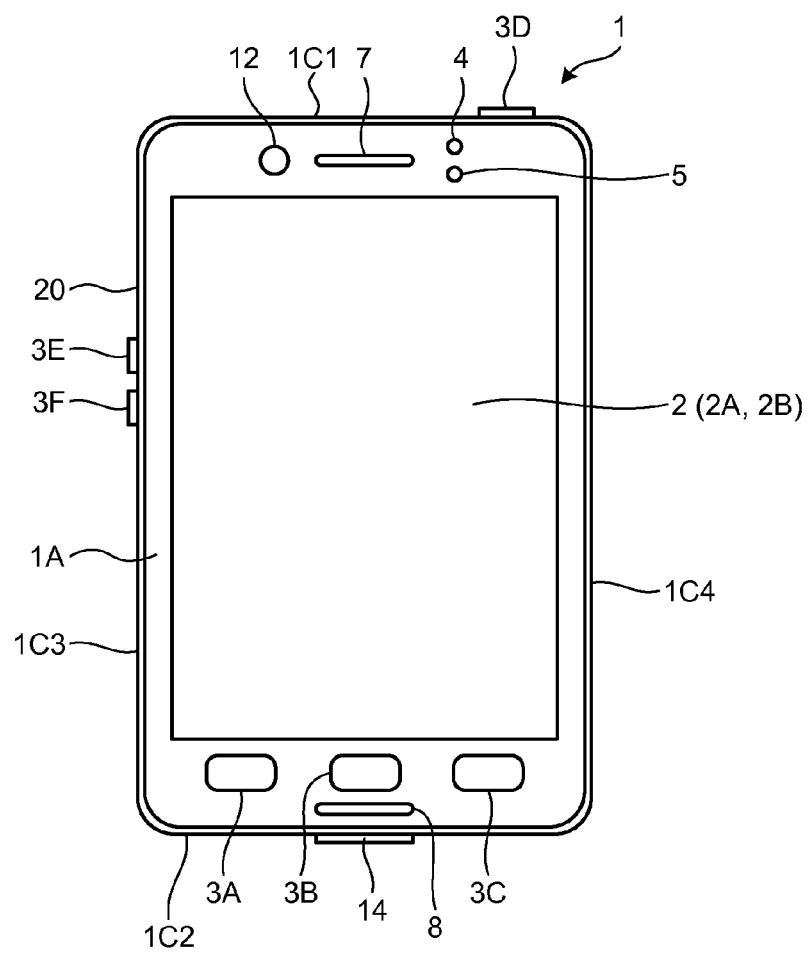
FIG. 2 is a front view of the smartphone.
Figure 3:
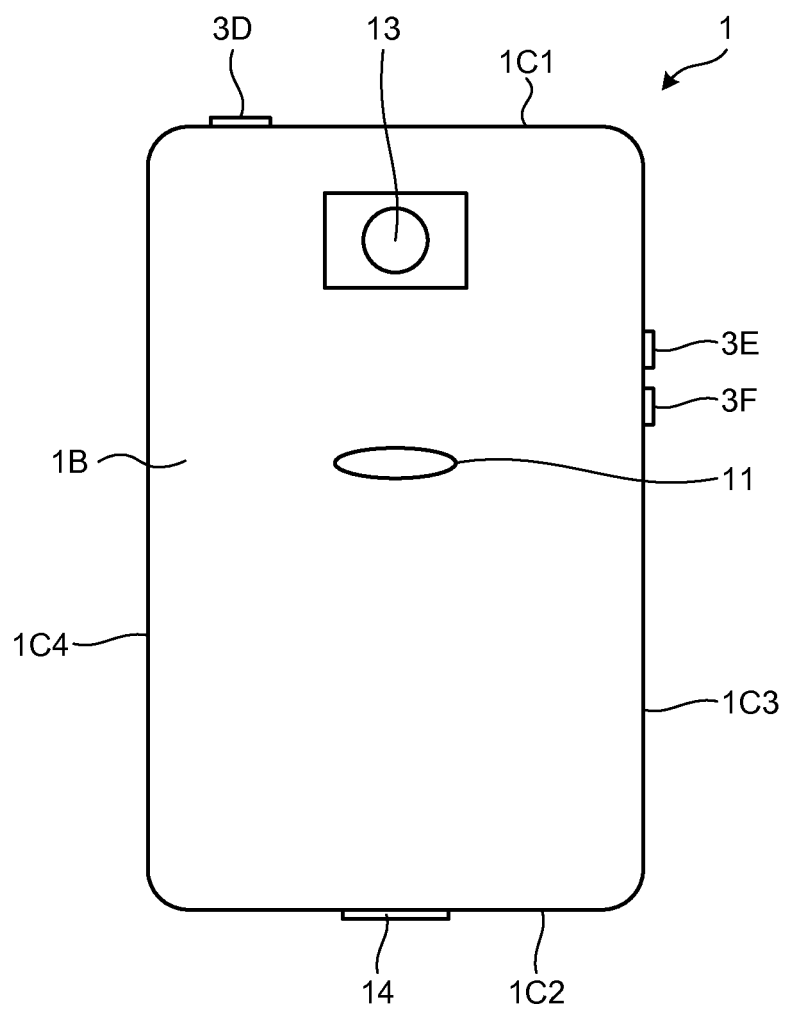
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
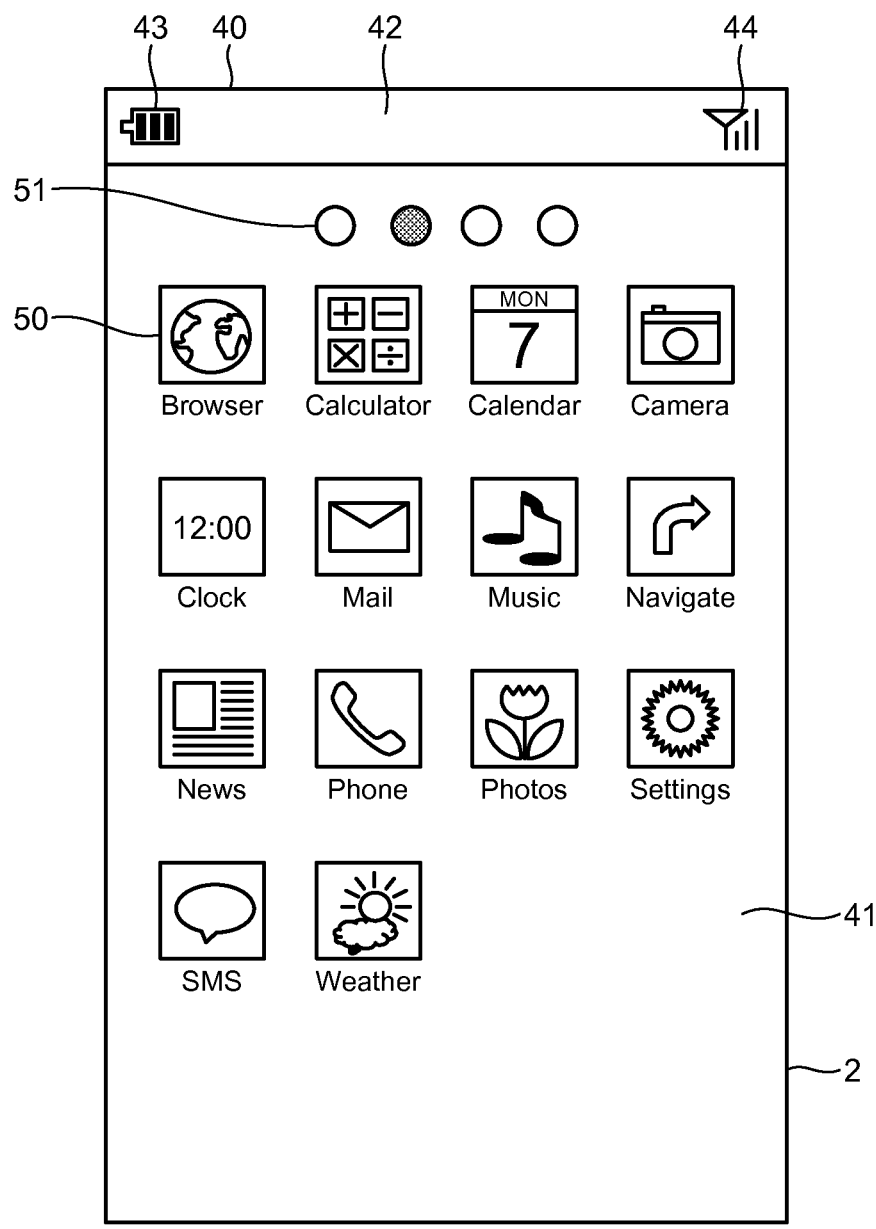
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application in the foreground.

When a click on a button 3B, or the like, is detected while the mail application is executed in the foreground, the smartphone 1 displays the home screen 40 on the display 2A and execute the mail application in the background. Thereafter, when detecting a tap on an icon 50 associated with a browser application, the smartphone 1 executes the browser application in the foreground.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The lower area of the home screen 40 is an area in which a history list (not illustrated in FIG. 4) to be described later is displayed. The history list is displayed on the home screen 40 when the button 3B, for example, is double clicked.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
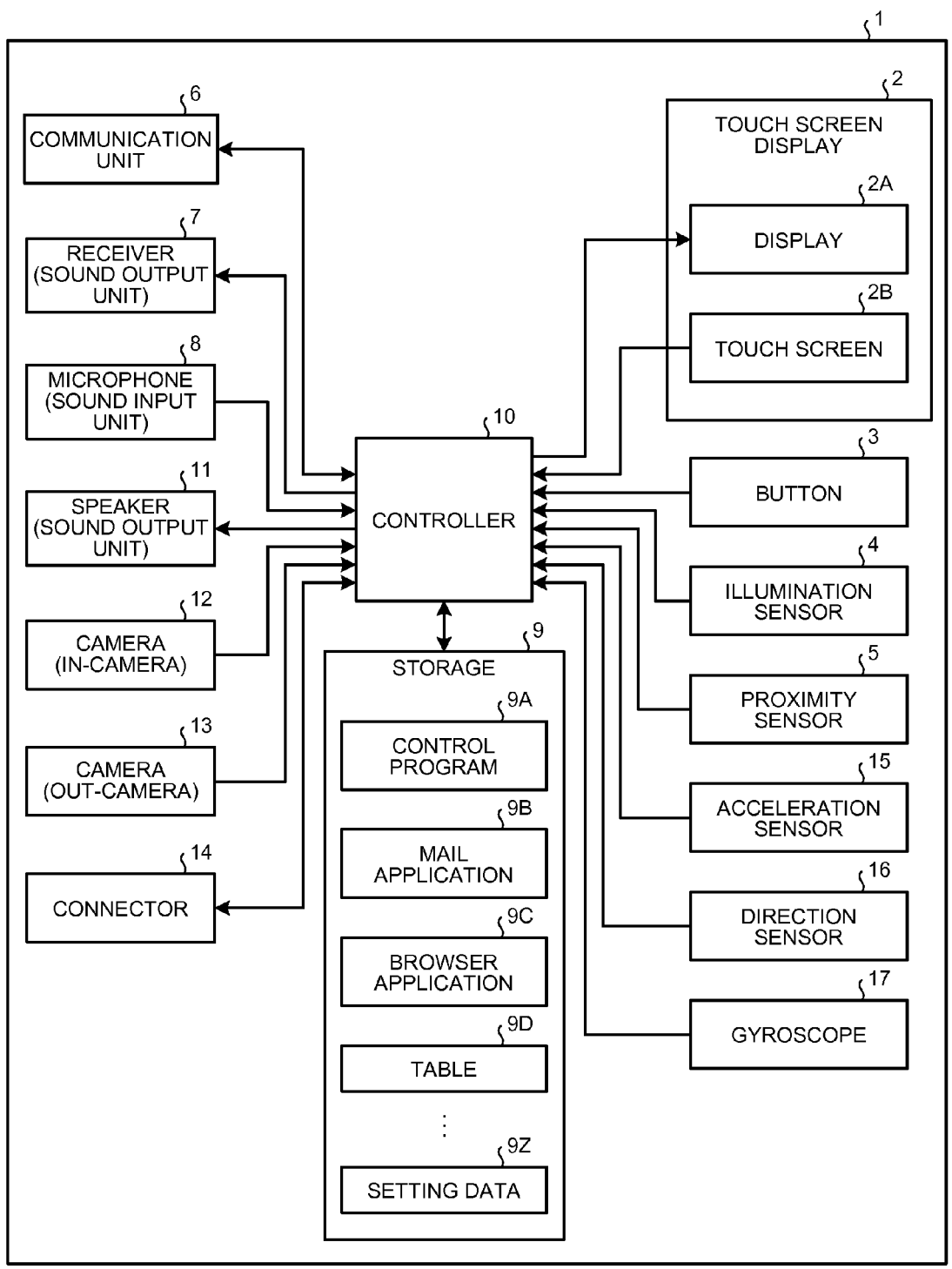
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, a table 9D, and setting data 9Z. The mail application 9B provides e-mail functions for composition, transmission, reception, display, and the like of an e-mail. The browser application 9C provides WEB browsing functions for displaying WEB pages. The setting data 9Z includes information on various settings for operation of the smartphone 1.

The control program 9A provides various control functions for operating the smartphone 1. The control program 9A realizes communications by controlling, for example, the communication unit 6, the receiver 7, the microphone 8, and the like. Functions provided by the control program 9A include, but are not limited to, a function of displaying a history list on the display 2A. The history list is a list of applications that are executed in foreground or background. The control program 9A also provides a function of switching between an application executed in the foreground and an application executed in the background, and a function of terminating an application that is executed in the foreground or background. A function provided by the control program 9A may be combined and used with a function provided by another program, such as a mail application 9B.

The table 9D is data in which applications and items related to the applications are associated to each other. The contents of the table 9D will be described in detail later.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 displays, for example, a history list that is a list of applications being executed in the foreground or background on the display 2A through execution of the control program 9A. Moreover, the controller 10 performs switching between the application executed in the foreground and the application executed in the background, and terminates the application executed in the foreground or background. The controller 10 terminates the application in case an operation to quit (stop, exit, etc) the application is performed by the user.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Then, the table 9D will be described with reference to FIG. 6. FIG. 6 is a diagram illustrating an example of the contents stored in the table 9D. As illustrated in FIG. 6, the table 9D stores therein the date and time when each application was downloaded, the date and time when the application was last executed, the number of times the application was executed in the last one month, a group to which the application belongs, and the like.

The table 9D stores therein that the date and time when "Browser" application was downloaded is 8 a.m. on Jan. 3, 201X. The table 9D stores therein that the date and time when the "Browser" application was last executed is 4 p.m. on Jul. 11, 201X, and the number of times the application was executed in the last one month is 576. These items are updated when the application is used.

The table 9D stores therein groups to which applications belong as items related to the applications. For example, applications related to a communication such as "Browser" and "Mail" belong to a "COMMUNICATION" group. Applications such as "Music", "Photos", and "SMS" belong to an "ENTERTAINMENT" group. The table 9D may store therein information of items related to a group in which a plurality of applications is gathered as well as information of items related to an application.

Items stored in the table 9D are not limited to those described above. The table 9D may store therein items that are different from the above-described items as items related to the applications. The table 9D may store therein, for example, the number of times that the application was executed in the last one week, a developer the application, and the like.

Figure 7A:
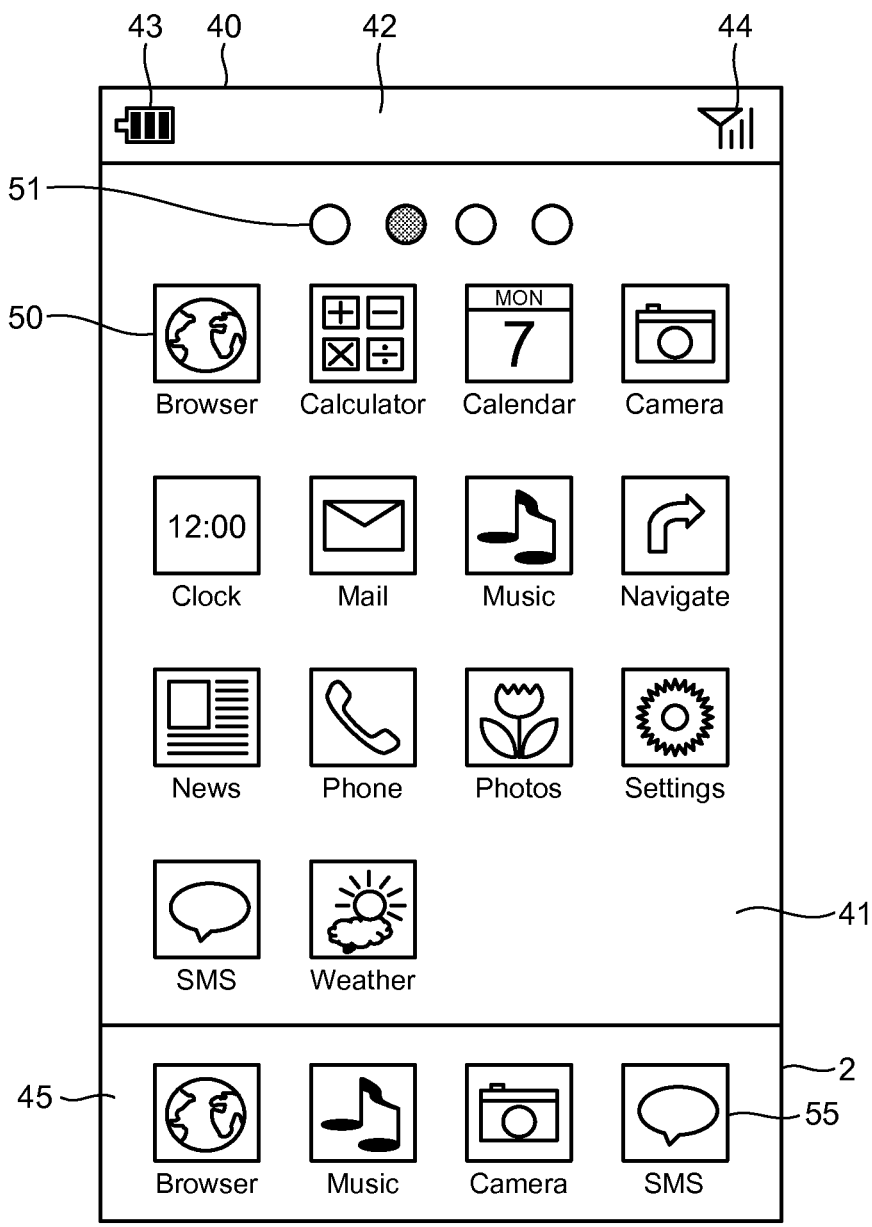
FIG. 7A is a diagram illustrating an example of a history list.
Figure 7B:
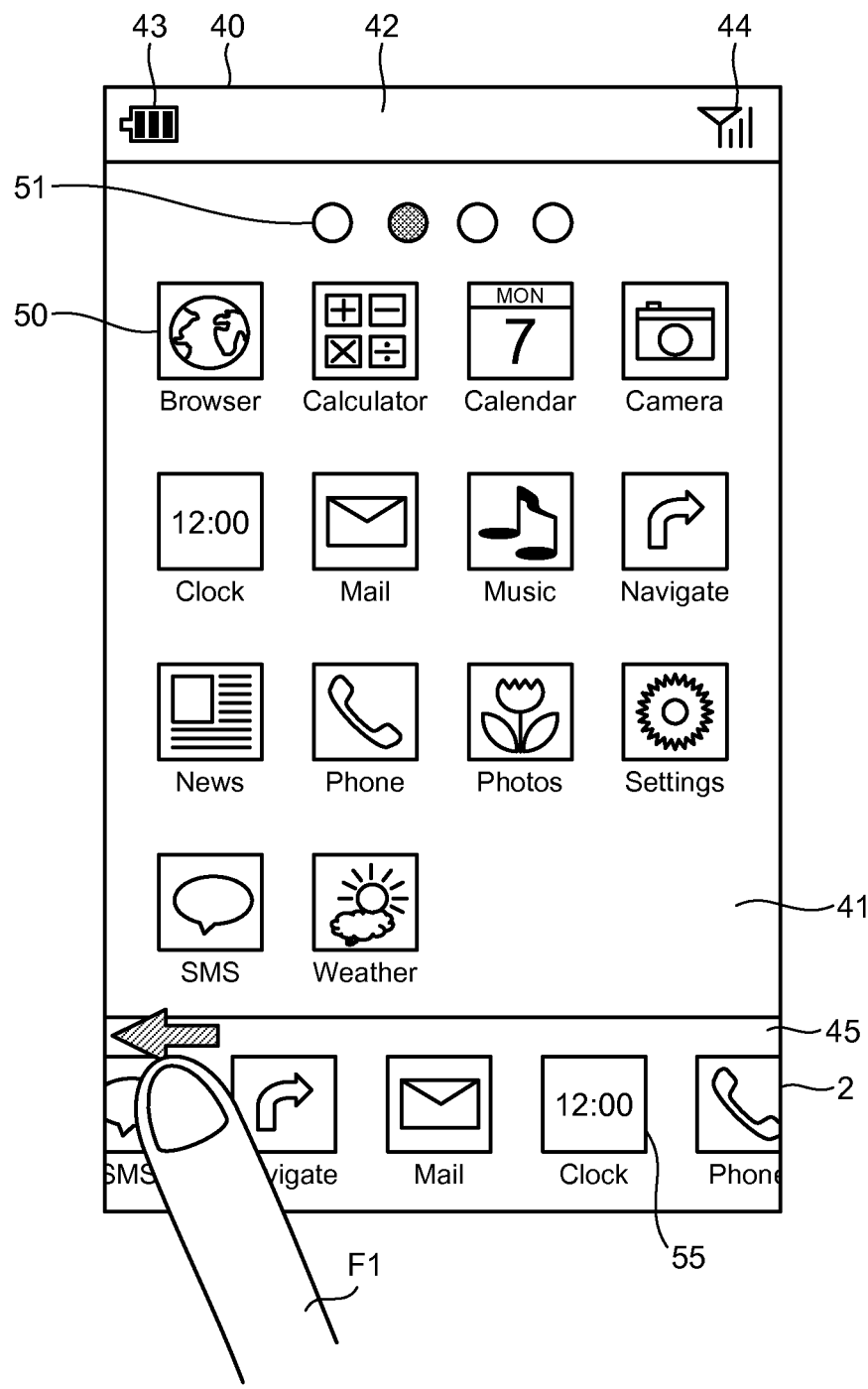
FIG. 7B is a diagram illustrating an example of the history list.

FIGS. 7A and 7B illustrate an example of a history list. As described above, a history list 45 is displayed on the lower area of the home screen 40. The history list 45 is positioned in the vicinity of a lower end portion of the home screen 40. The history list 45 is displayed on the display 2A, for example, when the button 3B is double clicked. When the button 3B is double clicked again in a state where the history list 45 is displayed on the display 2A, the history list 45 disappears.

The history list 45 is configured such that objects that indicate applications being executed in the foreground or background are displayed thereon. Examples of objects that indicate applications include icons, etc. On the history list 45 illustrated in FIG. 7A, four icons 55 are displayed along the left and right directions of the home screen 40. When a tap is detected on any one of the icons 55 displayed on the history list 45, the smartphone 1 displays a screen of the application that corresponds to the tapped icon 55 on the display 2A. The number of icons 55 displayed on the history list 45 is not limited to four. The number of the icons 55 displayed on the history list 45 may be three or less, or may be five or more.

A "Browser" icon among the four icons 55 illustrated in FIG. 7A is positioned on the left side of the home screen 40 than a "Music" icon. In the embodiment, such a position relationship between the icons 55 means that a "Browser" application was executed in the foreground later than a "Music" application. That is, as the icon 55 is positioned on the more left side of the history list 45, the time when the application that corresponds to the icon was executed in the foreground is closer to the present time.

When the button 3B is double clicked in the case where a screen of an application is displayed on the display 2A (that is, in the case where a certain application is being executed in the foreground), the smartphone 1 displays the history list 45 on the display 2A. Then, when a tap for the icon 55 that corresponds to the application being executed in the background is detected, the smartphone 1 executes the application that corresponds to the tapped icon in the foreground and executes the application, which has been executed in the foreground, in the background. That is, the smartphone 1 performs switching between the application being executed in the foreground and the application being executed in the background.

In FIG. 7B, a user's finger F1 moves to the left side in a state where the finger contacts an area that corresponds to the history list 45 in the touch screen display 2. In this case, the smartphone 1 detects a swipe for the history list 45. When the swipe for the history list 45 is detected, the smartphone 1 scrolls the history list 45 along the left and right directions of the home screen 40.

The display of the icon 55 is changed depending on the scroll of the history list 45. For example, although an "SMS"

icon is positioned at the right end on the history list 45 illustrated in FIG. 7A, the icon is positioned at the left end on the history list 45 illustrated in FIG. 7B, and only a part (right half) thereof is displayed. Besides the "SMS" icon, a "Navigate" icon, a "Mail" icon, a "Clock" icon, and a part (left half) of a "Phone" icon are displayed on the history list 45. These icons 55 are icons that indicate the applications which were executed prior to the "SMS" application. As described above, when the number of applications being executed is larger than the number (in this embodiment, four) of icons that can be displayed in an area of the history list 45 for one screen, the smartphone 1 can display all the icons 55 that indicate the applications being executed through a scroll of the history list 45.

As illustrated in FIGS. 7A and 7B, since the history list 45 is displayed in the vicinity of the lower end portion of the home screen 40, the same icon may be displayed on both sides of the home screen 40 and the history list 45. In this case, the smartphone 1 may set the display manner of the icon 50 being displayed in the home screen 40 and the display manner of the icon 55 being displayed on the history list 45 to be different from each other. The method for differently setting the display manners may includes, for example, setting colors of the icons to be different from each other and setting shapes of contours of designs of the icons to be different from each other.

The basic configuration of the smartphone 1 according to the embodiment has been described. Hereinafter, an example of a control to erase the display of an icon indicating the application being executed and to terminate the application corresponding to the icon of which the display is erased according to a user's gesture will be described.

Figure 8:
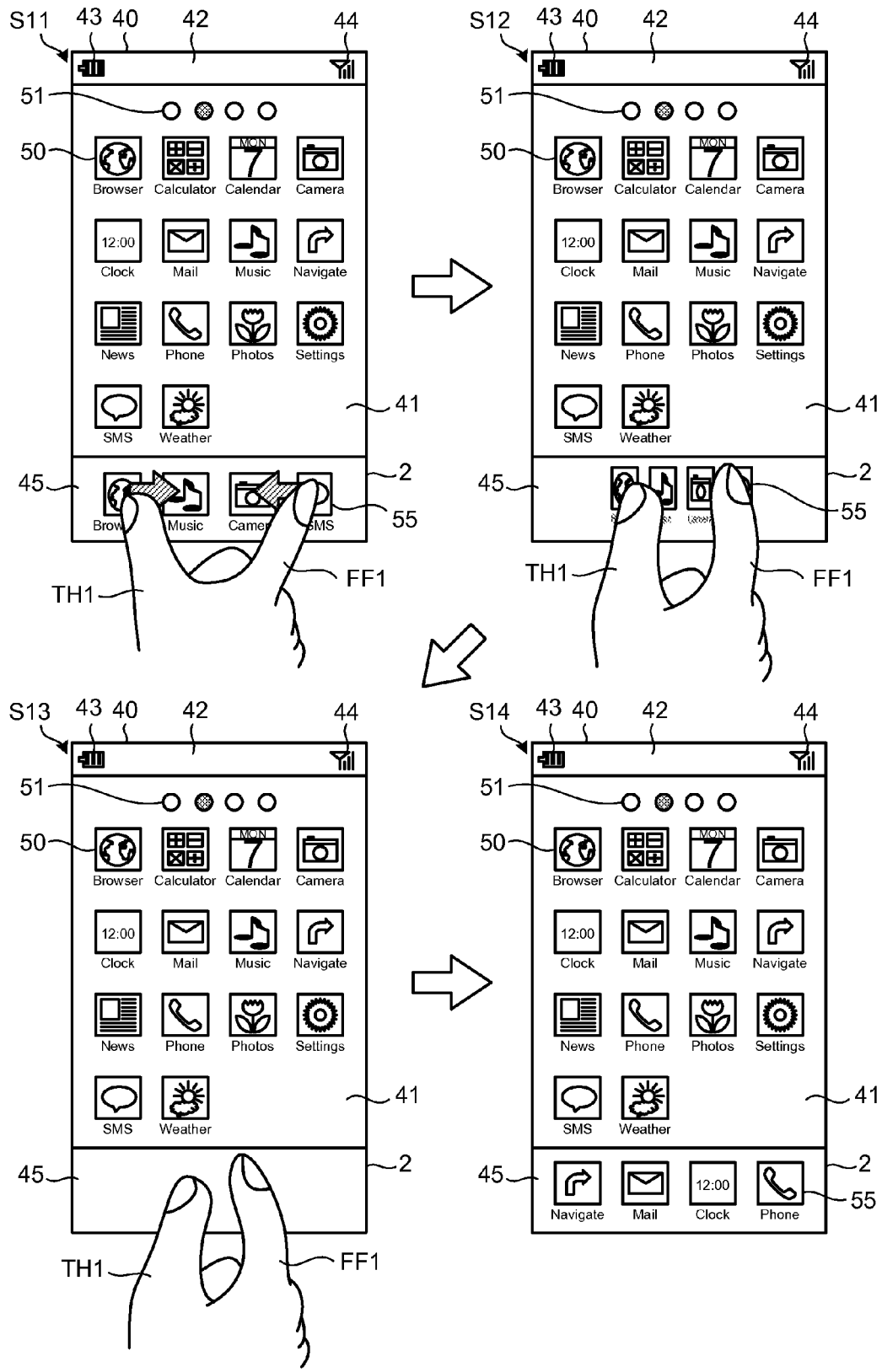
FIG. 8 is a diagram illustrating a first example of a control performed by the smartphone according to the first embodiment.

FIG. 8 is a diagram illustrating a first example of a control performed by the smartphone according to the first embodiment. As illustrated at Step S11, the smartphone 1 displays the home screen 40 as illustrated in FIG. 7A on the display 2A (touch screen display 2). The history list 45 is displayed on the lower portion of the home screen 40. On the history list 45, in the same manner as in FIG. 7A, four icons 55 are displayed side by side along the left and right directions of the home screen 40. Specifically, a "Music" icon and a "Camera" icon are inserted between a "Browser" icon and an "SMS" icon.

At Step S11, two user's fingers move in a direction in which the fingers approach each other in a state where the fingers contact areas that correspond to the "Browser" icon and the "SMS" icon. Specifically, a thumb TH1 and a forefinger FF1 are moving in directions approaching each other in a state where the thumb TH1 contacts an area corresponding to the "Browser" icon and the forefinger FF1 contacts an area corresponding to the "SMS" icon.

In this case, the smartphone 1 detects a gesture in which the "Browser" icon and the "SMS" icon relatively approach each other through the touch screen display 2. Specifically, the smartphone 1 detects a drag of the "Browser" icon in the right direction and a drag of the "SMS" icon in the left direction through the touch screen display 2.

When dragging of the "Browser" icon and the "SMS" icon is detected, the smartphone 1 displays the two icons in a manner in which the icons relatively approach each other according to a movement amount of the dragging as illustrated at Step S12, in comparison to the icons at Step S11. That is, the smartphone 1 displays the "Browser" icon and the "SMS" icon in a manner in which the distance between the "Browser" icon and the "SMS" icon is shortened according to the movement amount of the dragging in comparison to the icons at Step S11.

Moreover, at Step S12, as the distance between the position of the thumb TH1 and the position of the forefinger FF1, which is detected through the touch screen 2B, becomes shorter, the smartphone 1 displays the "Browser" icon, the "SMS" icon, and the "Music" and "Camera" icons positioned between them in a manner in which the icons are gradually deformed. The smartphone 1 displays the four icons 55 displayed on the history list 45 in a manner in which the length of each icon 55 in the left and right directions of the home screen 40 is gradually shortened in comparison to that of the icon at Step S11 in a squashed manner. That is, the smartphone 1 displays the four icons 55 in a manner in which the length of the four icons 55 in the direction in which the "Browser" icon and the "SMS" icon get closer to each other is gradually shortened to squash the icons 55.

In the case of deforming the icons 55 being displayed at Step S12, the smartphone 1 may perform a display process that is different from the above-described display process. For example, when the distance between the icons 55 is shortened without deforming the four icons 55 and the icons 55 contact each other, the smartphone 1 may display the icons 55 in a manner in which the icons 55 are gradually deformed by an external force applied from the side opposite to the contact face.

When the user's thumb TH1 and forefinger FF1 further approach each other from the state as illustrated at Step S12 and it is detected that the distance between the position of the thumb TH1 and the position of the forefinger FF1, which are detected through the touch screen 2B, becomes smaller than a predetermined threshold value stored in the setting data 9Z, the smartphone 1 erases the four icons 55 on the history list 45 as illustrated at Step S13. At this time, the smartphone 1 terminates the applications corresponding to the erased icons 55.

After erasing the display of the icons 55 at Step S13, the smartphone 1 again displays four icons 55 (a "Navigate" icon, a "Mail" icon, a "Clock" icon, and a "Phone" icon) on the history list 45 at Step S14. In the same manner as described above with reference to FIG. 7B, these are icons that correspond to applications executed prior to the "SMS" application. After erasing the display of the icons 55 at Step S13, the smartphone 1 may display the icons 55 in a manner in which the icons 55 slide from the right end of the history list 45 in the left direction.

In the first example illustrated in FIG. 8, when dragging of two icons at both ends among four icons 55 displayed side by side on the history list 45 is detected, the smartphone 1 terminates the applications that correspond to the two dragged icons and two icons positioned between the two dragged icons (i.e. all of the four icons 55). However, an operation to terminate applications is not limited thereto.

For example, when the dragging of the "Browser" icon in the right direction and the dragging of the "Camera" icon in the left direction are detected at Step S11 of FIG. 8, the smartphone 1 deforms the three icons 55 except for the "SMS" icon to display the deformed icons 55 at Step S12, but does not deform the "SMS" icon. At Step S13, the smartphone 1 terminates the "Browser" application, the "Music" application, and the "Camera" application, but does not terminate the "SMS" application. In this case, the smartphone 1 displays the "SMS" icon at the left end of the history list 45 and displays the "Navigate" icon, the "Mail" icon, and the "Clock" icon on the right side thereof at Step S14.

The smartphone 1 may not erase the display of the icon(s) 55 that are positioned between the two dragged icons 55 and may not terminate the application(s) corresponding thereto.

That is, the smartphone 1 may erase only the two dragged icons 55 and may terminate the applications corresponding to the erased icons 55. The smartphone 1 may erase any one of the two dragged icons 55 and may terminate the application corresponding to the erased icon 55.

Figure 9:
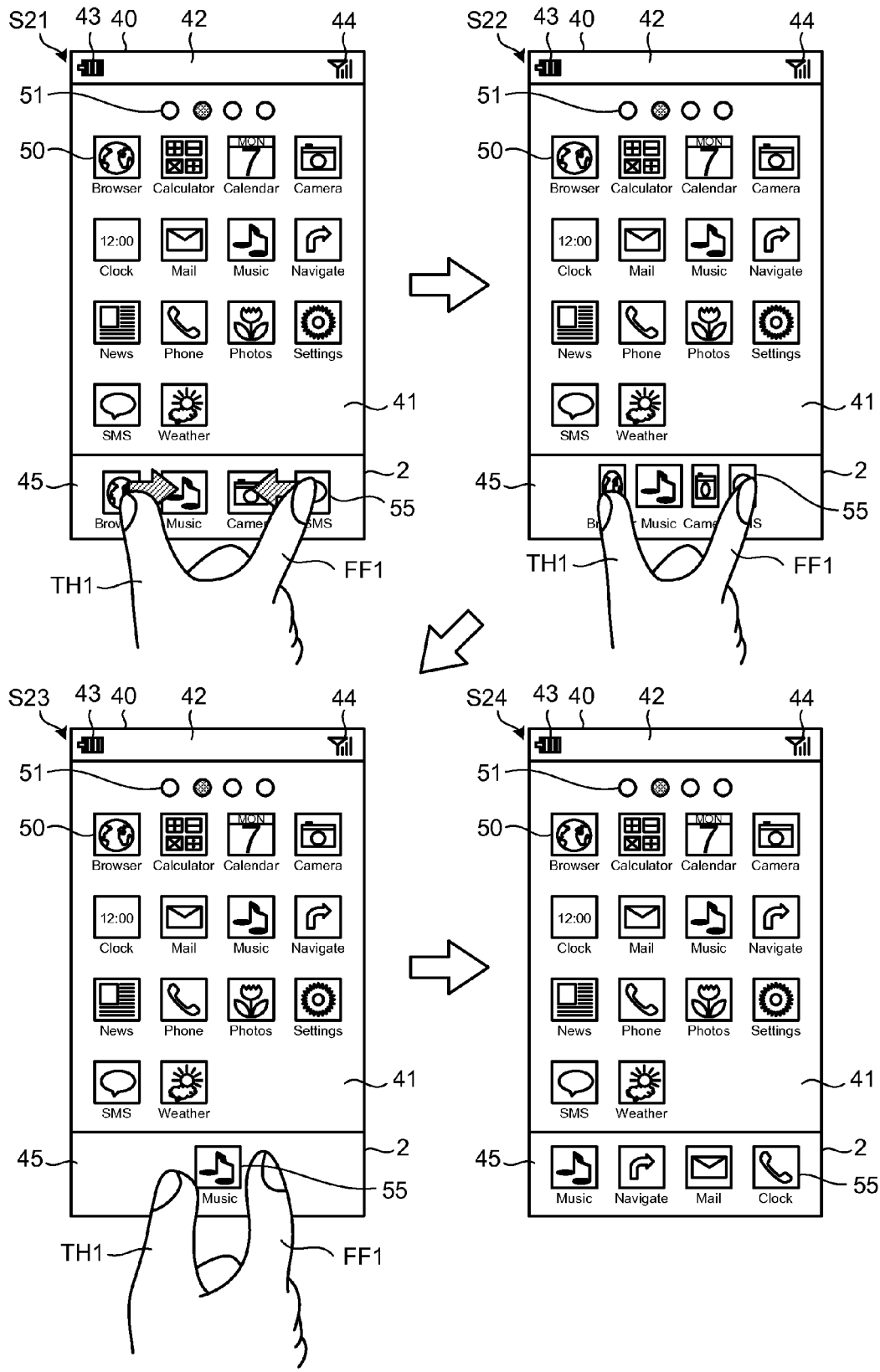
FIG. 9 is a diagram illustrating a second example of a control performed by the smartphone according to the first embodiment.

FIG. 9 is a diagram illustrating a second example of a control performed by the smartphone according to the first embodiment. In the second example, it is assumed that the smartphone 1 executes the "Music" application in the background and outputs music being reproduced through the receiver 7 or the speaker 11. At Step S21, in the same manner as in FIG. 7A, the history list 45 including the four icons 55 is displayed on the lower portion of the home screen 40. In the same manner as at Step S11, two user's fingers move in a direction in which the fingers approach each other in a state where the fingers contact areas that correspond to the "Browser" icon and the "SMS" icon.

At Step S22, the smartphone 1 deforms the three icons except for the "Music" icon among the four icons 55 displayed on the history list 45 to display the deformed icons, but does not deform the "Music" icon. At Step S23, the smartphone 1 erases the three icons except for the "Music" icon, but does not erase the "Music" icon to maintain the display of the "Music" icon. At Step S24, the smartphone 1 displays the "Music" icon at the left end of the history list 45 and displays the "Navigate" icon, the "Mail" icon, and the "Clock" icon on the right side thereof.

As described above, the smartphone 1 according to the second example of the first embodiment does not terminate the application in the case where the application that corresponds to the icon positioned between the two icons 55, which are targets for a gesture, outputs sound even if the gesture in which the two icons 55 displayed on the history list 45 relatively approach each other is detected. In FIG. 9, the "Music" icon indicating the "Music" application that outputs sound is arranged to be positioned between the icons 55 of which the gesture is detected; however, the case in which an application is not terminated is not limited thereto. Even when the gesture in which the "Music" icon and another icon 55 relatively approach each other is detected in a state where the "Music" application outputs sound, the smartphone 1 may not terminate the "Music" application.

FIG. 9 illustrates an example in which the smartphone 1 does not terminate the application that outputs the sound; however, the application that is not terminated is not limited thereto. For example, when an application that corresponds to any one of the two icons 55 that are targets for the gesture or to any one of the icon(s) positioned between the two icons 55 belong to a specified group stored in the table 9D, the smartphone 1 may not terminate the application. Alternatively, an exception list may be stored in the storage 9, and when the application that corresponds to any one of the two icons 55 that are targets for the gesture or to any one of the icon(s) positioned between the two icons 55 is an application registered in advance in the exception list, the smartphone 1 may not terminate the application.

As described above, the smartphone 1 according to the first embodiment terminates the applications that correspond to the two icons 55 when a gesture in which the two icons 55 displayed on the history list 45 relatively approach each other is detected. Accordingly, the smartphone 1 can terminate the applications being executed in the foreground or background through a simple operation, and thus the operability is improved.

When the above-described gesture is made, the smartphone 1 according to the first embodiment displays the icons 55 arranged on the history list 45 in a manner in which the icons 55 are squashed, and then erase the icons 55 and terminates the applications corresponding to the icons 55. Accordingly, the gesture for terminating the applications corresponds to a change of a display manner of the icons 55. Consequently, it becomes possible for a user to terminate the applications with an intuitive operation, and thus the operability of the smartphone 1 is further improved.

The smartphone 1 according to the first embodiment does not terminate a predetermined specified application and/or an application that outputs sound. Accordingly, a risk that comes with terminating the applications that the user does not intend to terminate can be reduced. In particular, the risk in which the user feels a sense of incongruity that is caused by abrupt terminating of the sound output being executed is reduced, and thus the operability of the smartphone 1 can be further improved.

Second Embodiment

Now, a second embodiment of the present invention will be described with reference to FIGS. 10 to 12. The configuration of the smartphone according to the second embodiment is the same as that of the smartphone according to the first embodiment. Accordingly, hereinafter, the smartphone according to the second embodiment will be described as a smartphone 1. Hereinafter, the description of terms that are common to the first embodiment may be omitted, and portions that are different from the first embodiment will mainly be described.

Figure 10:
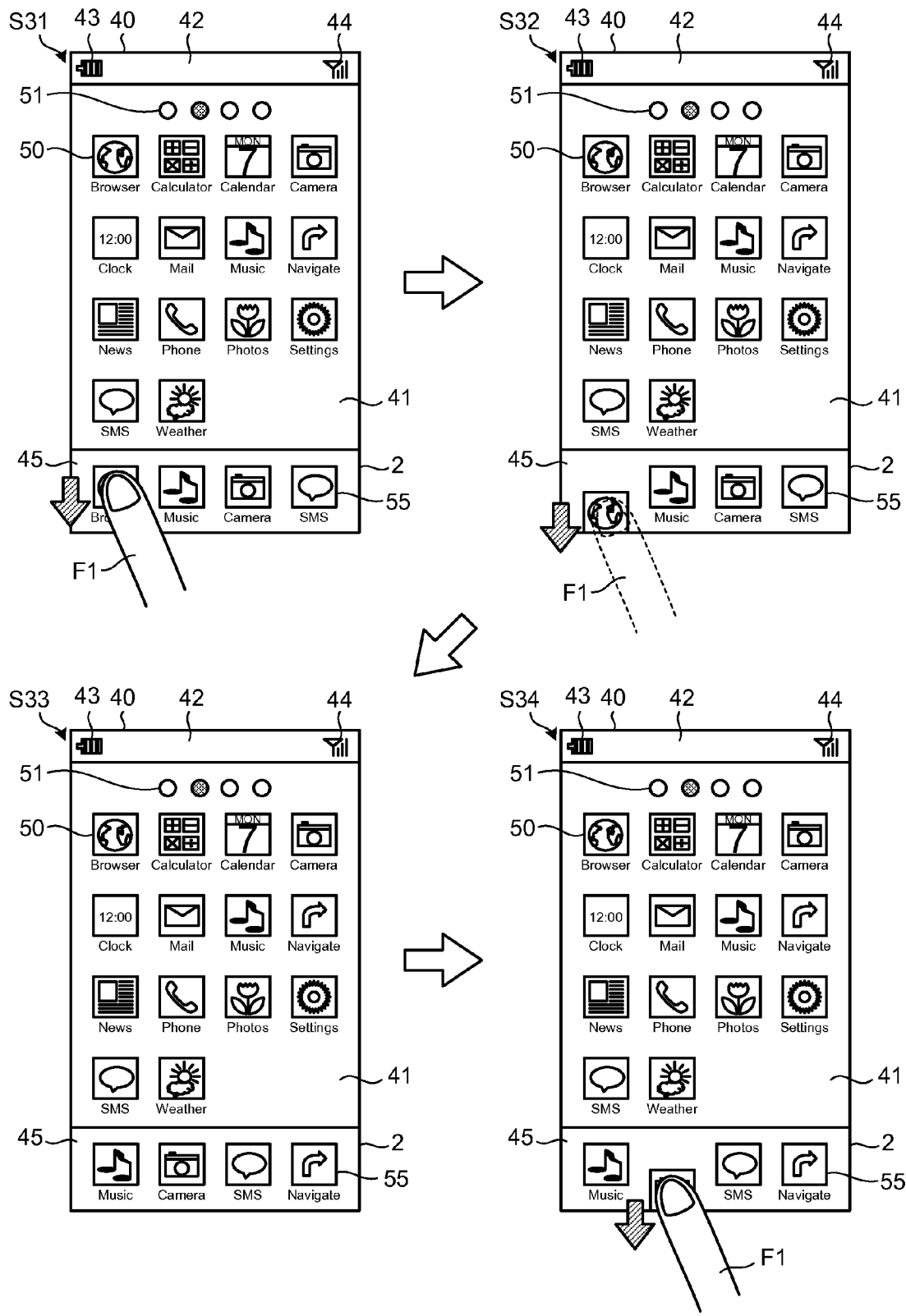
FIG. 10 is a diagram illustrating a first example of a control performed by a smartphone according to a second embodiment.

FIG. 10 is a diagram illustrating a first example of a control performed by the smartphone according to the second embodiment. At Step S31, in the same manner as in FIG. 7A, a history list 45 including four icons 55 is displayed on the lower portion of a home screen 40. At Step S31, a user's finger F1 contacts the area that corresponds to a "Browser" icon on the history list 45.

At Step S32, the user's finger F1 moves at high speed in a downward direction of the home screen 40 to go away from a touch screen 2B (touch screen display 2) in a state where the user's finger F1 contacts an area corresponding to the "Browser" icon. In this case, the smartphone 1 detects a downward flick with respect to the "Browser" icon through the touch screen display 2.

When the downward flick with respect to the "Browser" icon is detected, the smartphone 1 displays the "Browser" icon while gradually moving the "Browser" icon out of the home screen 40. At Step S32, a part of the "Browser" icon is displayed in a split manner at the lower end of the home screen 40. When the "Browser" icon moves further toward the outside of the home screen 40, the "Browser" icon is erased from the home screen 40. Thus, when a downward flick with respect to the "Browser" icon is detected, the smartphone 1 erases the display of the icon and terminates the "Browser" application.

At Step S33, in the same manner as at Step S31, four icons 55 are displayed on the history list 45. However, as the display of the "Browser" icon is erased, a "Music" icon, a "Camera" icon, and a "SMS" icon move to the left direction of the home screen 40, and a "Navigate" icon is displayed at the right end of the history list 45.

At Step S34, the user's finger F1 moves to the downward direction of the home screen 40 in a state where the user's finger F1 contacts an area corresponding to the "Camera" icon. In this case, the smartphone 1 detects a drag with respect to the "Camera" icon in the direction of the lower end portion of the home screen 40 through the touch screen display 2. When the distance of the detected drag is, for example, longer than a predetermined threshold value stored in setting data 9Z, the smartphone 1 erases the display of the icon 55 and terminates the application corresponding to the icon 55. For example, when the position of the user's finger F1 moves toward the outside of the history list 45 during the detection of the drag with respect to the icon 55, the smartphone 1 may erase the display of the icon 55 and terminate the application corresponding to the icon 55. As described above, even in the case where the drag with respect to the icon 55 displayed on the history list 45 is detected, the smartphone 1 erases the display of the icon 55 and terminates the application corresponding to the icon 55.

As the first example illustrated in FIG. 10, the flick that serves as a trigger for erasing the icon 55 and terminating the application corresponding to the icon 55 is not limited to the downward flick. The flick may be a flick that is directed toward another end portion of the history list 45. For example, in the control illustrated in FIG. 10, when the flick (upward flick) for the icon 55 in the direction of the upper end portion of the home screen 40 is detected, the smartphone 1 may erase the icon 55 and terminate the application corresponding to the icon 55. The direction of the flick for erasing the icon 55 and terminating the application corresponding to the icon 55 may be a direction (left or right direction in FIG. 7B) that is different from the direction in which the icons 55 displayed on the history list 45 are scrolled.

For example, it is assumed that the history list 45 is displayed vertically long in the vicinity of the right end portion of the home screen 40, and the scroll direction of the history list 45 is the upward or downward direction of the home screen 40. In this case, when a rightward flick with respect to the icon 55 is detected, the smartphone 1 may erase the icon 55 and terminate the application corresponding to the icon 55.

The drag at Step S34 is not limited to a drag in the direction of the lower end portion of the home screen 40, but may be a drag in another direction. The drag may be a drag toward a direction that is different from the direction in which the icons 55 displayed on the history list 45 are scrolled.

Figure 11:
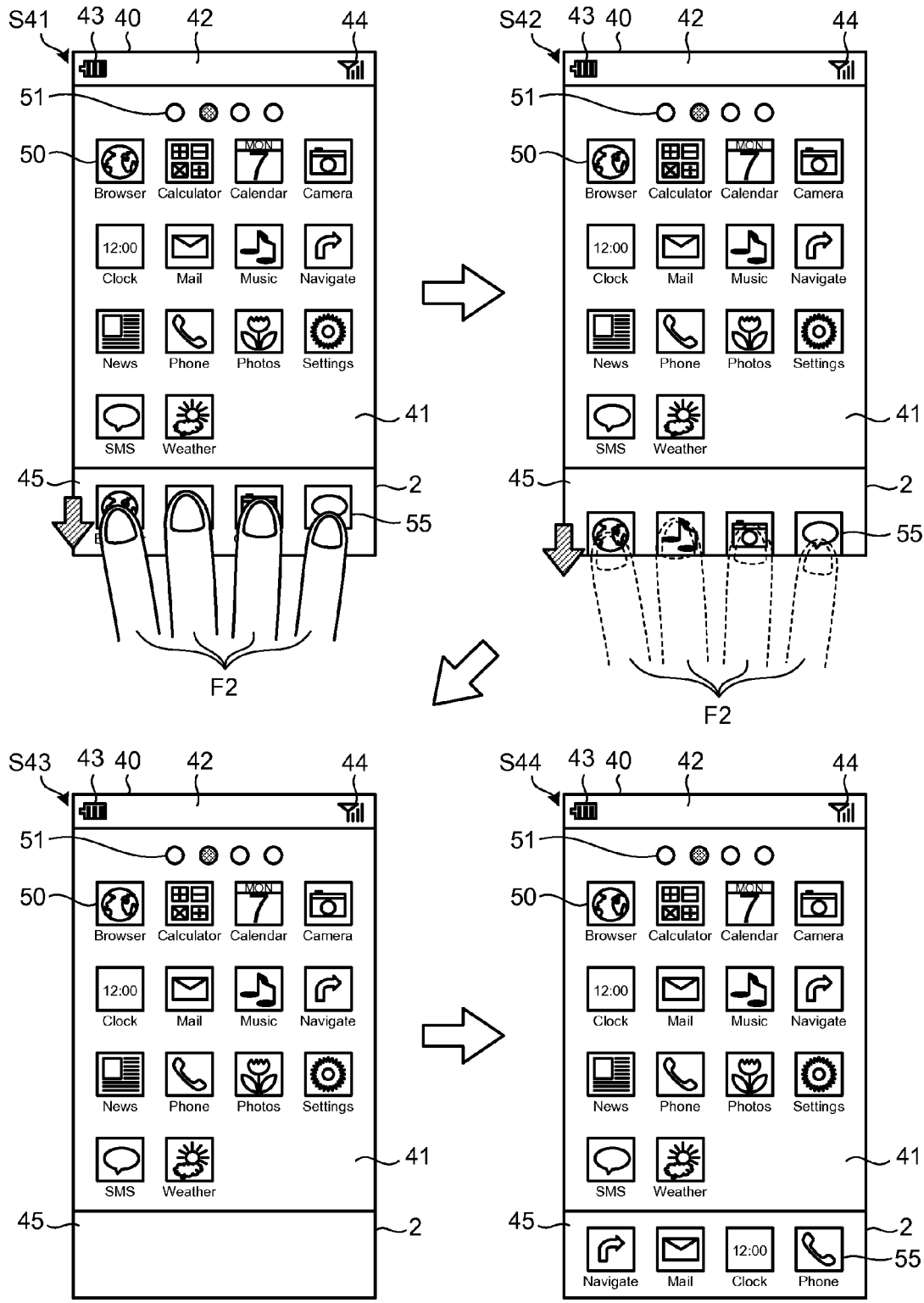
FIG. 11 is a diagram illustrating a second example of a control performed by the smartphone according to the second embodiment.

FIG. 11 is a diagram illustrating a second example of a control performed by the smartphone according to the second embodiment. At Step S41, in the same manner as in FIG. 7A, the history list 45 including four icons 55 is displayed on the lower portion of the home screen 40. At Step S41, four user's fingers F2 respectively contact areas that correspond to the four icons 55 on the history list 45.

At Step S42, the user's fingers F2 move at high speed in the downward direction of the home screen 40 to go away from the touch screen 2B (touch screen display 2) in a state where the user's fingers contact the areas corresponding to the icons 55 on the history list 45. In this case, the smartphone 1 detects a downward flick with respect to the respective icons 55 on the history list 45 through the touch screen display 2.

When the downward flick with respect to the respective icons 55 is detected, the smartphone 1 displays the icons 55 while gradually moving the icons 55 out of the home screen 40. At Step S42, parts of the icons 55 are displayed in a split manner at the lower end of the home screen 40.

As illustrated at Step S43, as the whole icons 55 move out of the home screen 40, the display of the icons 55 is erased. The smartphone 1 erases the display of the icons 55 and terminates the applications corresponding to the icons 55.

After erasing the display of the icons 55 at Step S43, the smartphone 1 again displays, as Step S44, four icons 55 on the history list 45 in the same manner as at Step S14 in FIG. 8.

In the second example illustrated in FIG. 11, the smartphone 1 can perform the erasing of the icon 55 illustrated in FIG. 10 and the terminating of the application even in the case where the flicks for the plurality of icons 55 are simultaneously detected. In the second example, a case where the flicks with respect to the four icons 55 are simultaneously detected has been described. However, the number of the flicks to be simultaneously detected is not limited thereto. For example, when flicks for three of four icons 55 are detected, the smartphone 1 may erase the three icons 55 and terminate the applications corresponding to the icons 55.

In the second example, when the dragging with respect to the plurality of icons 55 is detected and the dragging satisfies the conditions in the same manner as the first example illustrated in FIG. 10, the smartphone 1 may erase the display of the icons 55 and terminate the applications corresponding to the icons 55.

Figure 12:
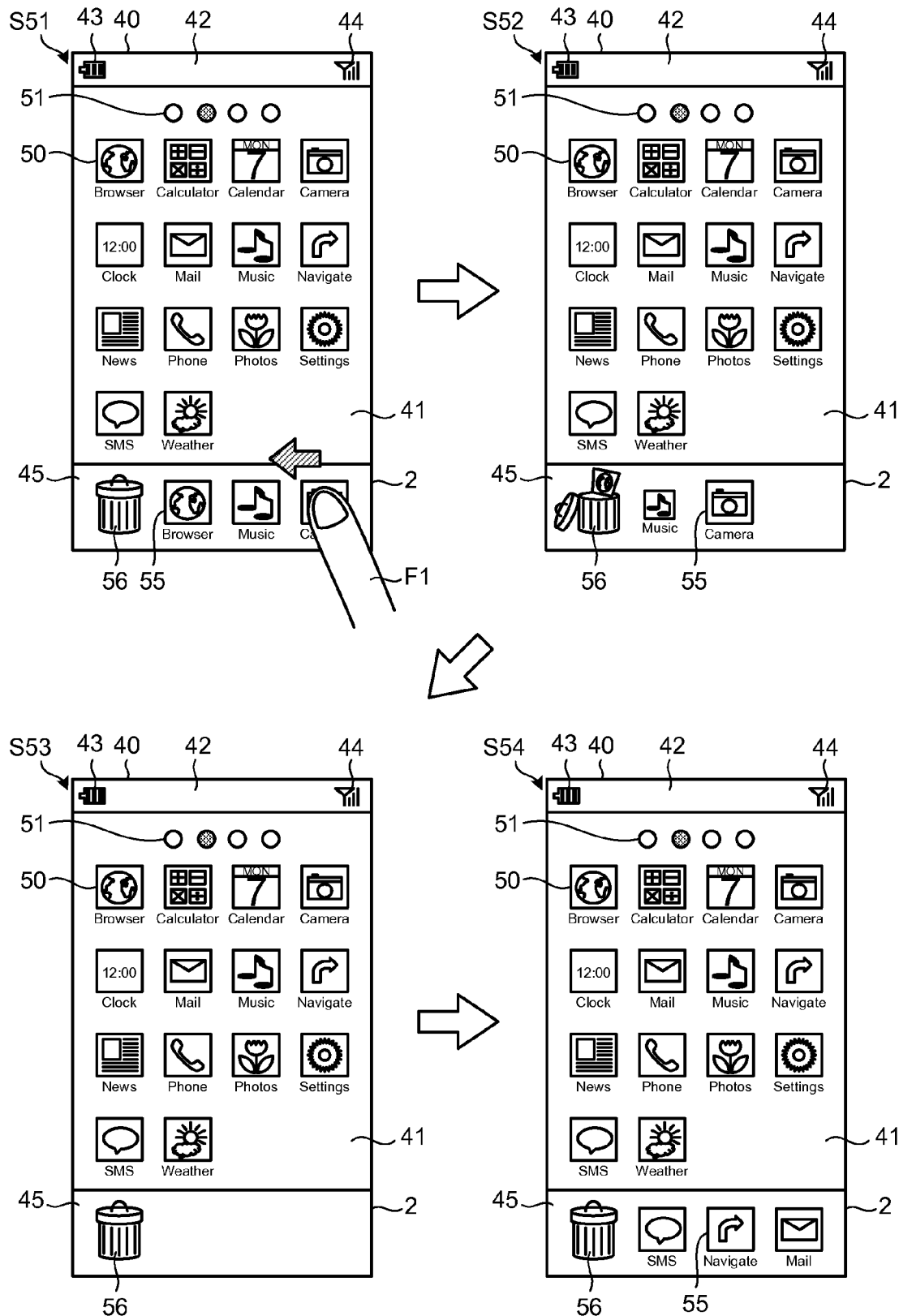
FIG. 12 is a diagram illustrating a third example of a control performed by the smartphone according to the second embodiment.

FIG. 12 is a diagram illustrating a third example of a control performed by the smartphone according to the second embodiment. At Step S51, the history list 45 is displayed on the lower portion of the home screen 40. At the left end of the history list 45, a trash icon 56 is displayed. On the right side of the trash icon 56, the "Browser" icon, the "Music" icon, and the "Camera" icon are displayed. The "Browser" icon and the "Music" icon are positioned between the "Camera" icon and the trash icon 56.

At Step S51, a user's finger F1 moves at high speed in the left direction of the home screen 40 to go away from the touch screen 2B (touch screen display 2) in a state where the user's finger F1 contacts the area corresponding to the "Camera" icon. In this case, the smartphone 1 detects a leftward flick with respect to the "Camera" icon through the touch screen display 2. That is, the smartphone 1 detects a flick with respect to the "Camera" icon in the direction toward the trash icon 56.

When the leftward flick with respect to the "Camera" icon is detected, as illustrated at Step S52, the smartphone 1 displays the three icons 55 on the display 2A so as to move the three icons 55 in the left direction. The smartphone 1 displays the trash icon 56 on the display 2A with its top cover open. At this time, the smartphone 1 displays the three icons 55 in a manner in which the three icons 55 become smaller as they move in the left direction, and are sucked into the trash icon 56 which has its top cover open.

When all the icons have been sucked into the trash icon 56 from the state illustrated at Step S52, as illustrated at Step S53, the display of the three icons 55 is erased, and only the trash icon 56 is displayed on the history list 45. At this time, the smartphone 1 terminates the applications corresponding to the erased icons 55. That is, when a flick that is directed toward the trash icon 56 is detected with respect to the "Camera" icon displayed on the history list, the smartphone 1 erases the display of the "Camera" icon as well as the "Browser" and the "Music" icons which are positioned between the "Camera" icon and the trash icon 56, and terminates the applications corresponding to the three erased icons.

After erasing the display of the three icons 55 at Step S53, the smartphone 1 displays again three icons 55 (an "SMS" icon, a "Navigate" icon, and a "Mail" icon) on the history list 45 at Step S54. They are icons that correspond to applications executed prior to the "Camera" application.

After erasing the display of the icons at Step S53, the smartphone 1 may display the icons 55 in a manner in which the icons 55 slide from the right end of the history list 45 in the left direction.

In the third example illustrated in FIG. 12, the flick that is directed toward the trash icon 56 is performed with respect to the "Camera" icon positioned at the right end of the history list 45. However, the icon for which a flick toward the trash icon 56 is performed is not limited thereto. For example, when a leftward flick with respect to the "Music" icon is detected, the smartphone 1 may erase the "Music" icon and the "Browser" icon that is positioned between the "Music" icon and the trash icon 56, and terminate the applications corresponding to the icons. In this case, the "Camera" icon is not erased, and the "Camera" application is not terminated. In the same manner, when a flick with respect to the "Browser" icon toward the trash icon 56 is detected, the smartphone 1 erases only the "Browser" icon and terminates only the "Browser" application.

The smartphone 1 does not need to erase the icons arranged between the icon to be flicked and the trash icon 56, and to terminate the application corresponding to the icon. For example, when a leftward flick with respect to the "Camera" icon is detected at Step S51, the smartphone 1 may erase only the "Camera" icon and terminate only the "Camera" application.

Even when a drag with respect to the icon 55 toward the trash icon 56 is detected, the smartphone 1 may erase the display of the icon 55 and terminate the application corresponding to the icon 55.

As described above, when a flick gesture with respect to the icon 55 displayed on the history list 45 to a predetermined direction is detected, the smartphone 1 according to the second embodiment terminates the application corresponding to the icon 55. Accordingly, the smartphone 1 can terminate the application being executed in the foreground or background through a simple operation, and thus the operability is improved.

In the same manner as the second example of the first embodiment illustrated in FIG. 9, when the application that corresponds to the icon positioned between the icon 55 being flicked and the trash icon 56 is, for example, a predetermined application, the smartphone 1 according to the second embodiment may not perform a process related to the erasing of the icon and the terminating of the application. However, when a flick in a predetermined direction with respect to the icon that indicates the predetermined application is detected, the smartphone 1 may perform the process related to the erasing of the icon and the terminating of the application.

Third Embodiment

Now, a third embodiment of the present invention will be described with reference to FIG. 13. The configuration of the smartphone according to the third embodiment of the present invention is the same as that of the smartphone according to the first embodiment. Accordingly, hereinafter, the smartphone according to the third embodiment will be described as a smartphone 1. Hereinafter, the description of terms that are common to the first embodiment or the second embodiment may be omitted, and portions that are different from the first embodiment or the second embodiment will mainly be described.

Figure 13:
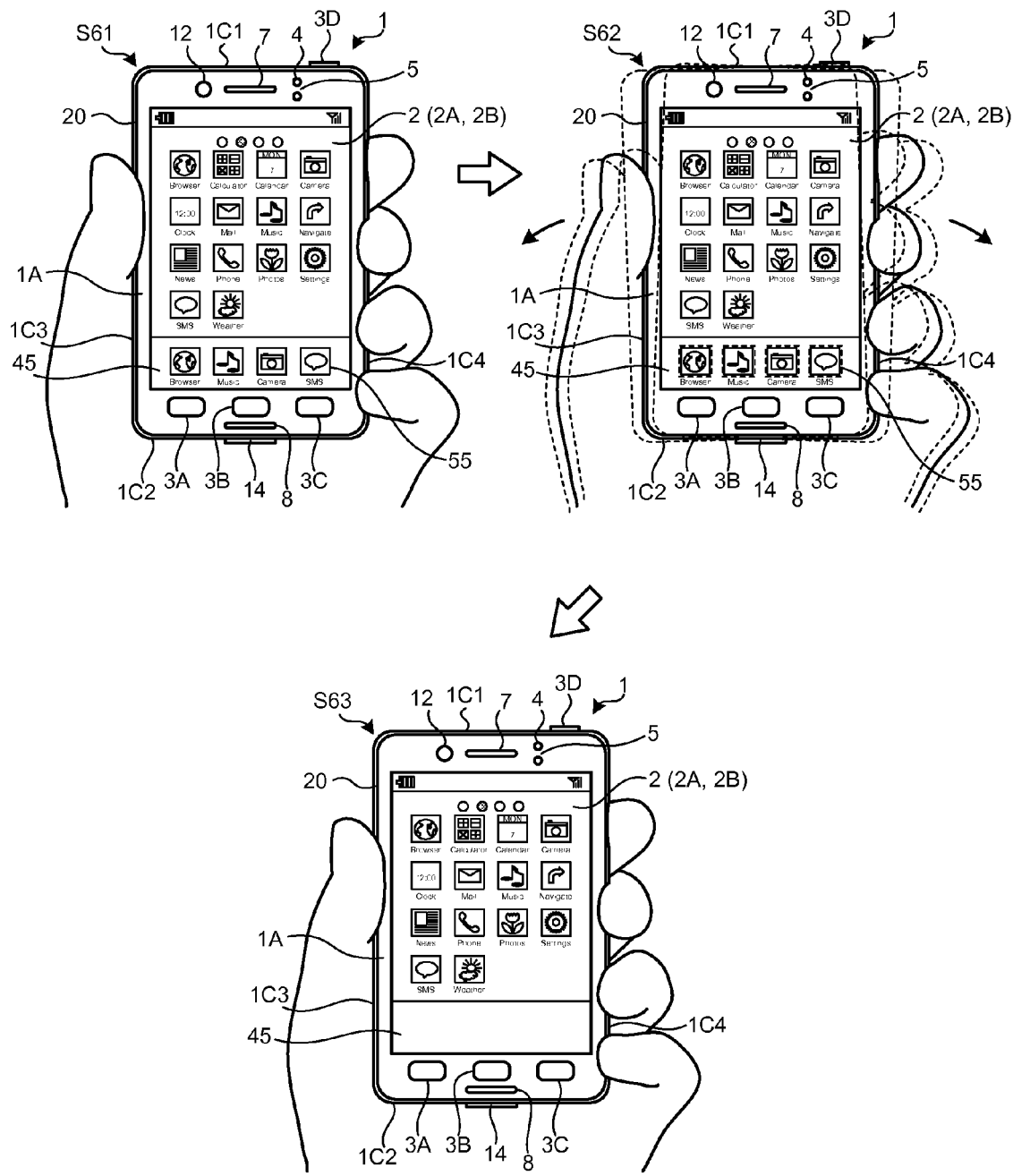
FIG. 13 is a diagram illustrating a first example of a control performed by a smartphone according to a third embodiment.

FIG. 13 is a diagram illustrating a first example of a control performed by the smartphone according to the third embodiment. Step S61 illustrates the state in which a user holds the smartphone 1, which displays a home screen 40 on a display 2A in the same manner as in FIG. 7A, in the user's hand. In the same manner as in FIG. 7A, four icons 55 are displayed on a history list 45.

At Step S62, the user shakes the smartphone 1 held in the user's hand from side to side. In this case, the smartphone 1 compares the direction and the magnitude of the acceleration, which is applied to the smartphone 1 and is detected by an acceleration sensor 15, with threshold values stored in setting data 9Z. Besides, the smartphone 1 displays the four icons 55 on the display 2A as if the icons were vibrating.

For example, when a predetermined time stored in the setting data 9Z elapses in a state where the magnitude of the acceleration that acts on the smartphone 1 exceeds the threshold value, the smartphone 1 erases the display of the four icons 55 and terminates the applications corresponding to the respective icons 55 at Step S63.

When the predetermined time stored in the setting data 9Z elapses in a state where the acceleration in a specified direction acts on the smartphone 1, the smartphone 1 may erase the display of the icons 55 and terminate the applications corresponding to the icons 55.

Figure 14:
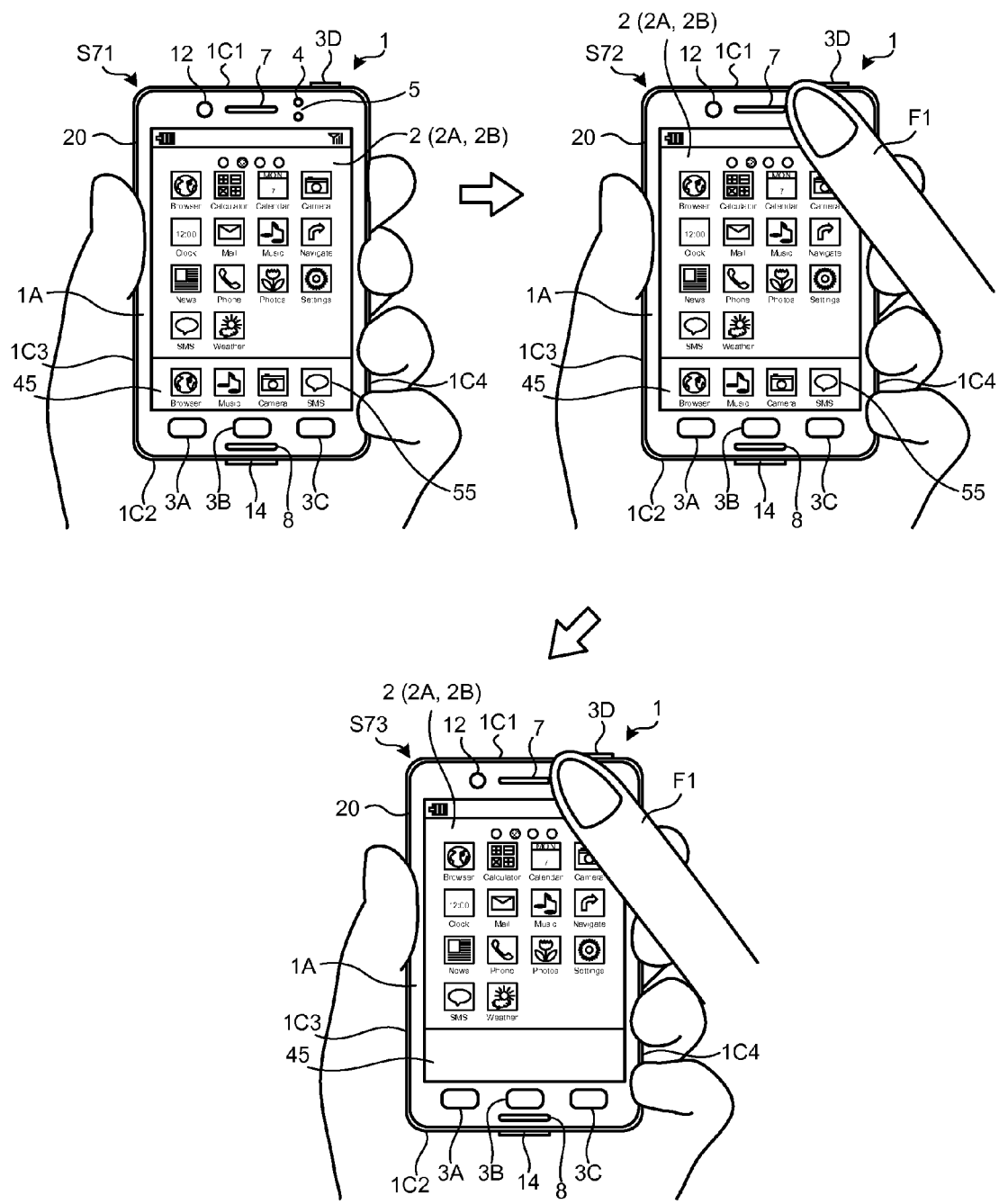
FIG. 14 is a diagram illustrating a second example of a control performed by the smartphone according to the third embodiment.

FIG. 14 is a diagram illustrating a second example of a control performed by the smartphone according to the third embodiment. Step S71 illustrates the state in which a user holds in the user's hand the smartphone 1 that displays the home screen 40 on the display 2A in the same manner as in FIG. 7A. In the same manner as in FIG. 7A, four icons 55 are displayed on the history list 45.

At Step S72, a user's finger F1 approaches a position in which the user's finger F1 blocks an illumination sensor 4 and a proximity sensor 5 provided on a front face 1A of the smartphone 1 in a state where the user holds the smartphone 1 in the user's hand. In this case, the smartphone 1 compares an illumination detected by the illumination sensor 4 with a threshold value stored in the setting data 9Z. The smartphone 1 detects the presence of the user's finger F1 through the proximity sensor 5.

For example, when a predetermined time stored in the setting data 9Z elapses in a state where the detected illumination is below the threshold value, the smartphone 1 erases the display of the four icons 55 and terminates the applications corresponding to the respective icons 55 at Step S73.

When the predetermined time stored in the setting data 9Z elapses in a state where the presence of the user's finger F1 is detected by the proximity sensor 5 in the vicinity of the smartphone 1, the smartphone 1 may erase the display of the icons 55 and terminate the applications corresponding to the respective icons 55. That is, based on the detection results on any one of the illumination sensor 4 or the proximity sensor 5, the smartphone 1 may erase the display of the icons 55 and terminate the applications corresponding to the respective icons 55.

When the predetermined time stored in the setting data 9Z elapses in a state where the illumination detected by the illumination sensor 4 is below the threshold value and the presence of the user's finger F1 is detected by the proximity sensor 5 in the vicinity of the smartphone 1, the smartphone 1 may erase the display of the icons 55 and terminate the applications corresponding to the respective icons 55. That is, based on the detection results of both the illumination sensor 4 and the proximity sensor 5, the smartphone 1 may erase the display of the icons 55 and terminate the applications corresponding to the respective icons 55.

Figure 15:
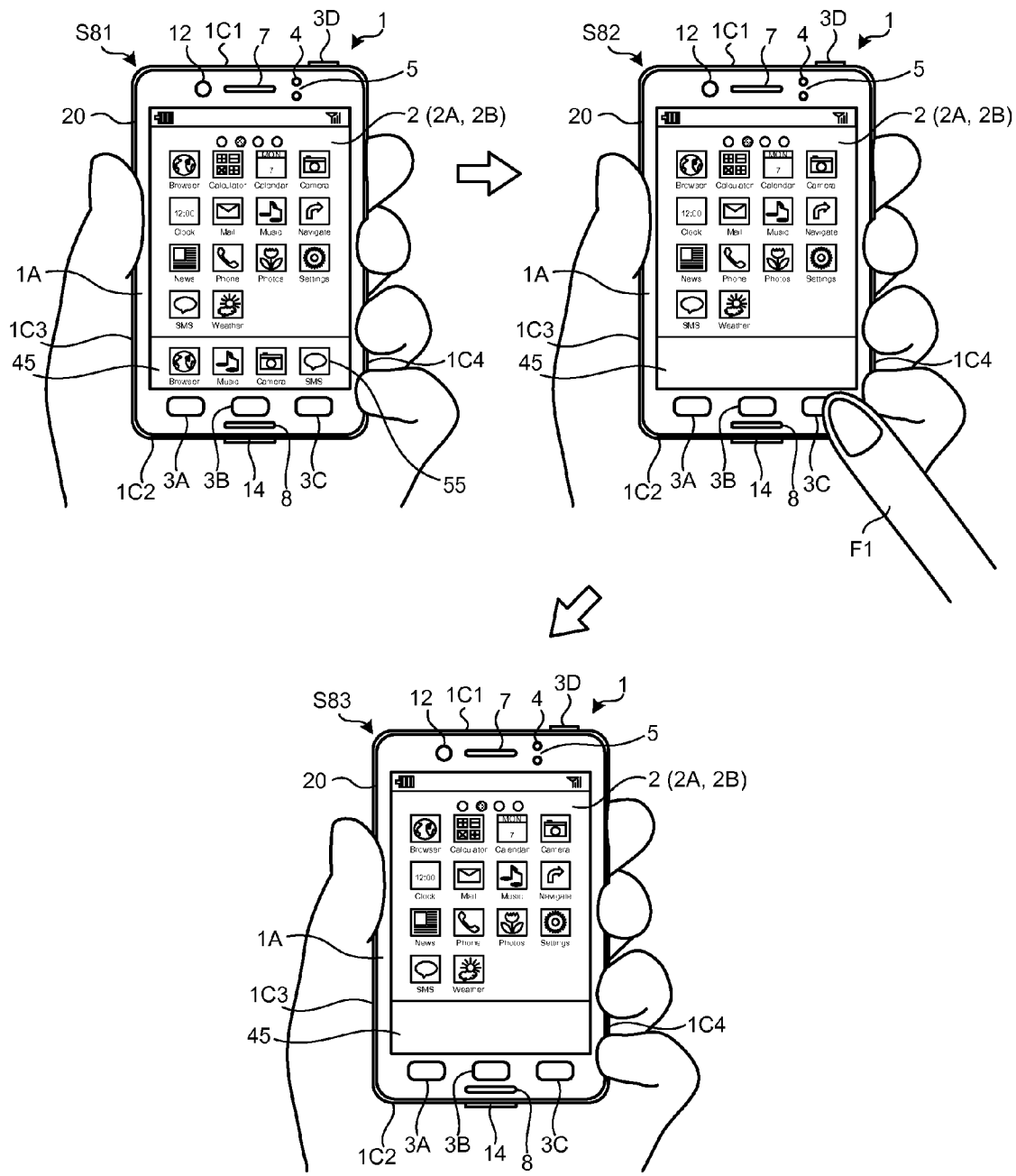
FIG. 15 is a diagram illustrating a third example of a control performed by the smartphone according to the third embodiment.

FIG. 15 is a diagram illustrating a third example of a control performed by the smartphone according to the third embodiment. Step S81 illustrates the state in which a user holds the smartphone 1, which displays the home screen on the display 2A 40 in the same manner as in FIG. 7A, in the user's hand. In the same manner as in FIG. 7A, four icons 55 are displayed on the history list 45.

At Step S82, the user presses a button 3C provided on the front face 1A of the smartphone 1 with the user's finger F1 in a state where the user holds the smartphone 1 in the user's hand. In this case, the smartphone 1 detects a click for the button 3C.

For example, when the click for the button 3C is detected, the smartphone 1 erases the display of the four icons 55 and terminates the applications corresponding to the respective icons 55 at Step S83.

As described above, the smartphone 1 according to the third embodiment terminates the applications corresponding to the icons 55 displayed on the history list 45 according to at least one of the detection results of the button 3, the illumination sensor 4, the proximity sensor 5, and the acceleration sensor 15. Accordingly, the smartphone 1 can terminate the applications being executed in the foreground or background through a simple operation, and thus the operability is improved.

In the third embodiment, the smartphone 1 terminates all the applications that correspond to the four icons 55 displayed on the history list 45 according to the detection results of the acceleration sensor 15 or the like, but a manner in which applications are terminated is not limited thereto. For example, in the first example illustrated in FIG. 13 or the second example illustrated in FIG. 14, when the detection results of several sensors satisfy the predetermined conditions, the smartphone 1 may erase the icons 55 one by one and terminate the applications corresponding to the icons 55 one by one whenever the predetermined time elapses. In the third example illustrated in FIG. 15, when the click for the button 3C is detected, the smartphone 1 may erase the icons 55 one by one and terminate the applications corresponding to the icons 55 one by one.

According to the detection results of a detection unit such as the acceleration sensor 15, the smartphone 1 may erase not only the four icons 55 displayed on the history list 45 but also the icons 55 (see FIG. 7B), which are not displayed on the current history list 45 but appear on the history list 45 by scrolling, and terminate the applications corresponding to the icons 55. In this case, the smartphone 1 may terminate all the applications being executed in the foreground and the background, or may terminate all the applications being executed in the background but may not terminate the applications being executed in the foreground.

In the same manner as the second example of the first embodiment illustrated in FIG. 9, in the case where the application corresponding to the icon 55 displayed on the history list 45 is the predetermined specified application, the smartphone 1 according to the third embodiment may not perform the process related to the erasing of the icon and the terminating of the application.

Figure 16:
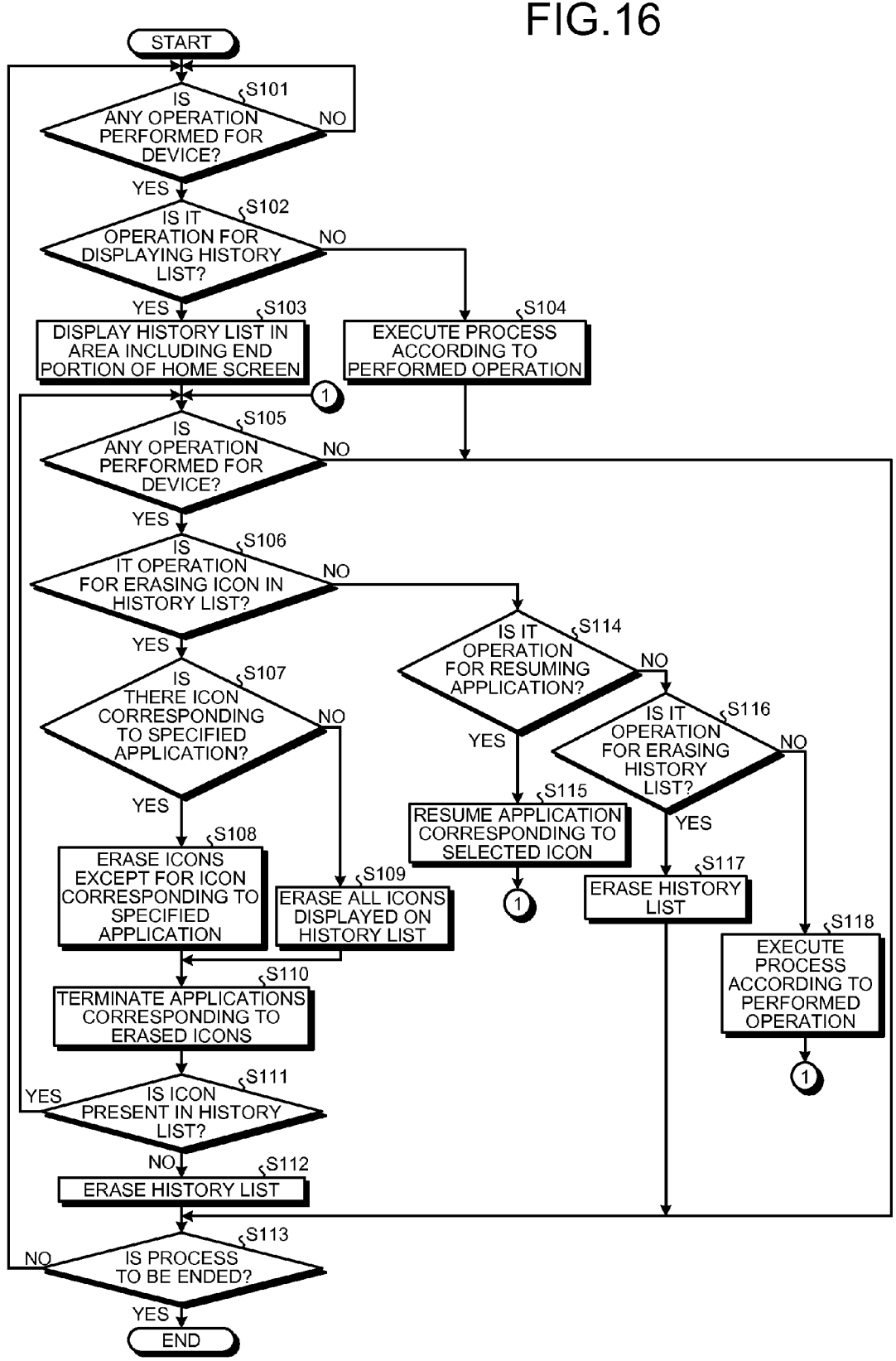
FIG. 16 is a flowchart illustrating a control procedure performed by the each of smartphones according to the first to third embodiments.

Then, the procedure in which the smartphone 1 terminates the applications corresponding to the icons displayed on the history list 45 will be described with reference to FIG. 16. This procedure is common to the first embodiment, the second embodiment, and the third embodiment. FIG. 16 is a flowchart illustrating a control performed by a controller 10 of the smartphone 1. The controller 10 may execute another procedure in parallel with the procedure illustrated in FIG. 16.

First, the controller 10 of the smartphone 1 determines whether or not any operation has been made with respect to the smartphone 1 at Step S101. When it is determined that no operation has been made with respect to the smartphone 1 ("No" at Step S101), the controller 10 proceeds to Step S101. Thus, the controller 10 repeats the process of Step S101 until any operation is detected with respect to the smartphone 1 at Step S101.

When it is determined that any operation has been made with respect to the smartphone 1 ("Yes" at Step S101), the controller 10 proceeds to Step S102. At Step S102, the controller 10 determines whether or not the operation that has been made with respect to the smartphone 1 is an operation for displaying the history list 45 on the display 2A. An example of the operation for displaying the history list 45 on the display 2A is double-clicking the button 3B.

When it is determined that the operation which has been made with respect to the smartphone 1 at Step S101 is not the operation for displaying the history list 45 ("No" at Step S102), the controller 10, at Step S104, performs the operation according to the operation detected at Step S101. Then, the controller 10 proceeds to Step S113.

When it is determined that the operation which has been made with respect to the smartphone 1 at Step S101 is the operation for displaying the history list 45 ("Yes" at Step S102), the controller 10 proceeds to Step S103. The controller 10 displays the history list 45 on a predetermined area in the vicinity of an end portion of the home screen 40 and arranges the icons 55 on the history list 45 at Step S103. Then, the controller 10 proceeds to Step S105.

At Step S105, the controller 10 determines whether or not any operation has been made with respect to the smartphone 1. When it is determined that no operation has been made with respect to the smartphone 1 ("No" at Step S105), the controller 10 proceeds to Step S113.

When it is determined that any operation has been made with respect to the smartphone 1 ("Yes" at Step S105), the controller 10 proceeds to Step S106. At Step S106, the controller 10 determines whether or not the operation made with respect to the smartphone 1 is the operation for erasing an icon 55 on the history list 45.

The operation for erasing an icon 55 on the history list 45 is, for example, a gesture in which the plurality of icons 55 relatively approaches each other as illustrated in FIG. 8. The operation for erasing an icon 55 on the history list 45 is, for example, a flick gesture or a drag gesture with respect to the icon 55 in a predetermined direction as illustrated in FIG. 10. The operation for erasing an icon 55 on the history list 45 is, for example, shaking the smartphone 1 side to side in a state where the user holds the smartphone 1 in the user's hand as illustrated in FIG. 13.

When it is determined that the operation performed with respect to the smartphone 1 at Step S105 is the operation for erasing an icon 55 on the history list 45 ("Yes" at Step S106), the controller 10 proceeds to Step S107. At Step S107, the controller 10 determines whether or not the icon 55 that indicates a specified application is included in operation targets. The specified application is, for example, an application that outputs sound or an application that belongs to a specified group stored in the table 9D.

When it is determined that the icon 55 indicating the specified application is included in the target operations ("Yes" at Step S107), the controller 10 proceeds to Step S108. At Step S108, the controller 10 erases the icons 55 except for the icon 55 that indicates the specified application among the icons 55 included in the operation targets from the history list 45. Furthermore, when the number of icons 55 displayed on the history list 45 is three or less and there is any application executed prior to the applications corresponding to the erased icons 55, the controller 10 displays the icon 55 that corresponds to the application on the history list 45. Then, the controller 10 proceeds to Step S110.

When it is determined that the icon 55 indicating the specified application is not included in the target operations ("No" at Step S107), the controller 10 proceeds to Step S109. At Step S109, the controller 10 erases all the icons 55 that correspond to the operation targets. When there is any application executed prior to the applications corresponding to the erased icons 55, the controller 10 displays the icon 55 that corresponds to the application on the history list 45. Then, the controller 10 proceeds to Step S110.

At Step S110, the controller 10 terminates all the applications that correspond to the icons 55 erased from the history list 45, and proceeds to Step S111.

At Step S111, the controller 10 determines whether or not the icon 55 is present on the history list 45. When it is determined that the icon 55 is present on the history list 45 ("Yes" at Step S111), the controller 10 proceeds to Step S105. When it is determined that the icon 55 is not present on the history list 45 ("No" at Step S111), the controller 10 proceeds to Step S112.

At Step S112, the controller 10 erases the history list 45. Then, the controller 10 proceeds to Step S113.

At Step S113, the controller 10 determines whether or not a series of processes is to be ended. When the series of processes continues ("No" at Step S113), the controller 10 proceeds to Step S101. When the series of processes is to be ended ("Yes" at Step S113), the controller 10 terminates the corresponding processes.

When it is determined that the operation performed with respect to the smartphone 1 at Step S105 is not the operation for erasing the icons 55 on the history list 45 ("No" at Step S106), the controller 10 proceeds to Step S114. At Step S114, the controller 10 determines whether or not the operation performed with respect to the smartphone 1 at Step S105 is an operation for resuming the applications from the history list 45. The operation for resuming the applications from the history list 45 is, for example, a tap gesture with respect to the icons 55 displayed on the history list 45.

When it is determined that the operation at Step S105 is the operation for resuming the applications from the history list 45 ("Yes" at Step S114), the controller 10 proceeds to Step S115. At Step S115, the controller 10 resumes the applications corresponding to the tapped icons 55 in the foreground and arranges the tapped icons 55 at the left end of the history list 45. Then, the controller 10 proceeds to Step S105.

When it is determined that the operation at Step S105 is not the operation for resuming the applications from the history list 45 ("No" at Step S114), the controller 10 proceeds to Step S116. At Step S116, the controller 10 determines whether or not the operation at Step S105 is the operation for erasing the history list 45. The operation for erasing the history list 45 is, for example, double clicking the button 3B.

When it is determined that the operation at Step S105 is the operation for erasing the history list 45 ("Yes" at Step S116), the controller 10 proceeds to Step S117. At Step S117, the controller 10 erases the history list 45. Then, the controller 10 proceeds to Step S113. The process at Step S113 is as described above.

When it is determined that the operation at Step S105 is not the operation for erasing the history list 45 ("No" at Step S116), the controller 10 proceeds to Step S118. At Step S118, the controller 10 performs an operation according to the operation made with respect to the smartphone 1 at Step S105. For example, the controller 10 scroll-displays the history list 45 as illustrated in FIG. 7B. Then, the controller 10 proceeds to Step S105.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the respective embodiments described above, the smartphone displays objects that indicate applications being executed in the foreground or background on the history list; however, the history list is not limited thereto. The smartphone 1 may display objects that indicate applications already terminated on the history list. That is, the history list may not be a list that indicates the applications being actually executed, but may be a list that indicates an execution order of the applications.

In this case, when an application that corresponds to an icon on the history list is being executed, the smartphone erases the icon and terminates the corresponding application according to the gesture detected through the touch screen or the detection results by several detection units. When an application that corresponds to an icon on the history list is not being executed, the smartphone erases the icon but does not terminate the corresponding application according to the gesture or the like.

In this case, the smartphone may display only the icons of the applications being actually executed on the history list according to the predetermined operation. For example, when shake in the left and right directions is detected by the acceleration sensor while the history list is displayed, or when pressing of the button 3 is detected while the history list is displayed, the smartphone may erase only the icons of the applications that have already been terminated from the history list and may display only the icons of the applications being actually executed on the history list. Thereafter, when the shake in the left and right directions is detected again by the acceleration sensor, or the pressing of the button 3 is detected again, the smartphone may display the icons of the applications that have already been terminated on the history list.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

A device may include: a touch screen display for displaying an object corresponding to a program in execution; and a controller for terminating the program corresponding to the object when a gesture with respect to the object is detected through the touch screen display.

The gesture with respect to the object may be a flick gesture.

The touch screen display may be configured to display a plurality of objects including a first object, each of objects corresponding to a program in execution.

The controller may be configured to scroll the objects when a gesture in a first direction is detected on an area where the objects are displayed through the touch screen display, and to terminate an first program corresponding to the first object when a gesture in a second direction with respect to the first object is detected through the touch screen display.

The objects may further include a second object, and the controller may be configured to terminate the first program and a second program corresponding to the second object when a gesture in a second direction with respect to the first object and the second object is detected through the touch screen display.

The objects may further include a second object, and the controller may be configured to terminate a third program corresponding to a third object displayed between the first object and the second object when a gesture of moving the first object and the second object in directions approaching each other.

The controller may be configured to further terminate a first program corresponding to the first object and a second program corresponding to the second object.

The controller may be configured to deform the third object on the touch screen display according to a distance between the first object and the second object.

The controller may be configured not to terminate the third program when the third program is executed for reproducing a sound.

The controller may be configured not to terminate the third program when the third program belongs to a specified group.

The device may further include an acceleration sensor, and the controller may be configured to terminate programs corresponding to the objects when a shake operation of the device is detected through the acceleration sensor.

The device may further include a sensor for detecting illumination of an ambient light, and the controller may be configured to terminate programs corresponding to the objects depending on a detection of the sensor.

The device may further include a sensor for detecting presence of a nearby object, and the controller may be configured to terminate programs corresponding to the objects depending on a detection of the sensor.

The device may further include a button, and the controller may be configured to terminate programs corresponding to the objects upon a press of the button.

The gesture with respect to the object may be a flick gesture in a direction to a forth object displayed on the touch screen display.

The controller may be configured to erase the object upon terminating the program corresponding to the object.

A method for controlling a device including a touch screen display may include: displaying an object corresponding to a program in execution on the touch screen display; detecting a gesture with respect to the object through the touch screen display; and terminating the program corresponding to the object upon the detecting.

A non-transitory storage may store a program. When executed by a device including a touch screen display, the program may cause the device to execute: displaying an object corresponding to a program in execution on the touch screen display; detecting a gesture with respect to the object through the touch screen display; and terminating the program corresponding to the object upon the detecting.

A device may include: a touch screen display for displaying an object corresponding to either an application in execution or an application terminated; and a controller for erasing the object when a flick gesture with respect to the object is detected through the touch screen display.

The controller may be configured to erase the object when the flick gesture, a direction of which is different from a direction in which the object is scrolled, with respect to the object is detected through the touch screen display.

In a case where the object indicates the application in execution, the controller may erase the object and terminate the application when the flick gesture with respect to the object is detected through the touch screen display.

A method for controlling a device including a touch screen display may include: displaying an object corresponding to either an application in execution or an application terminated on the touch screen display; and erasing the object when a flick gesture with respect to the object is detected through the touch screen display.

A non-transitory storage medium may store a program. When executed by a device including a touch screen display, the program may cause the device to execute: displaying an object corresponding to either an application in execution or an application terminated on the touch screen display; and erasing the object when a flick gesture with respect to the object is detected through the touch screen display.

What is claimed is:

1. A device, comprising:
a storage configured to store a table that includes correspondence relationships between a plurality of programs in the device and a plurality of groups, wherein the plurality of the programs includes a plurality of terminated programs and a plurality of executed programs;
a touch screen display configured to display
a home screen having different first and second areas,
in the first area, a plurality of terminated program objects corresponding to the plurality of terminated programs, and
in the second area, a history list in response to a user's input, the history list including a plurality of executed program objects corresponding to the plurality of executed programs in execution; and
a controller configured to simultaneously terminate the plurality of the executed programs corresponding to the plurality of executed program objects when a gesture with respect to at least two of the plurality of executed program objects in the history list is detected through the touch screen display,
wherein
the touch screen display is configured to display the plurality of executed program objects corresponding to the plurality of executed programs in both the first area of the home screen and the history list,
the touch screen display is configured to display, in the history list, the plurality of executed program objects corresponding to the plurality of executed programs in an order reverse to an order in which the plurality of executed program objects were executed, the plurality of executed program objects comprises first, second and third executed program objects, the touch screen display is configured to display, in the history list, the third executed program object between the first and second executed program objects, when a gesture of moving the first executed program object and the second executed program object in directions approaching each other is detected in the history list,
- when the third executed program does not belong to a specific group among the plurality of groups in the table, the controller is configured to
  - (a) simultaneously terminate first, second and third executed programs corresponding to the first, second and third executed program objects, respectively, and
  - (b) erase the first, second, and third executed program objects from the history list, and
- when the third executed program belongs to the specific group among the plurality of groups in the table, the controller is configured to
  - (i) simultaneously terminate first and second executed programs, but maintain the third executed program in execution, and
  - (ii) erase the first and second executed program objects from the history list, but keep displaying the third executed program object in the history list, when an executed program object corresponding to one of the plurality of executed programs except the first executed program is selected from any one of the history list and the first area of the home screen,
- the controller is configured to resume the executed program and then move the executed program object corresponding to the resumed program from an initial position in the history list to a left side of the first executed program object in the history list, and when one of the plurality of terminated programs is selected from the first area of the home screen,
- the controller is configured to execute and then add a new executed program object corresponding to the executed program to the history list at the left side of the first executed program object in the history list.

2. The device according to claim 1, wherein
the gesture with respect to at least two of the plurality of executed program objects is a flick gesture.

3. The device according to claim 1, wherein
the controller is configured
- to scroll the executed program objects when a gesture in a first direction is detected, through the touch screen display, on an area in the history list where the executed program objects are displayed, and
- to terminate the first executed program corresponding to the first executed program object when a gesture in a second direction with respect to the first executed program object is detected through the touch screen display from the history list.

4. The device according to claim 3, wherein
the controller is configured to terminate the first executed program and the second executed program when a gesture in the second direction with respect to the first executed program object and the second executed program object is detected through the touch screen display from the history list.

5. The device according to claim 1, wherein
the controller is configured to, in response to the gesture of moving the first executed program object and the second executed program object in the directions approaching each other, deform the third executed program object in the history list on the touch screen display according to a distance between the first executed program object and the second executed program object.

6. The device according to claim 1, wherein
the controller is configured to,
- when the gesture of moving the first executed program object and the second executed program object in the directions approaching each other is detected through the touch screen display,
- terminate the third executed program corresponding to the third executed program object except when the third executed program is executed for reproducing a sound.

7. The device according to claim 1, further comprising an acceleration sensor, wherein
the controller is configured to terminate the executed programs corresponding to the executed program objects when a shake operation of the device is detected through the acceleration sensor.

8. The device according to claim 1, further comprising a sensor for detecting illumination of an ambient light,
wherein the controller is configured to terminate the executed programs corresponding to the executed program objects depending on a detection of the sensor.

9. The device according to claim 1, further comprising a sensor for detecting presence of a nearby object,
wherein the controller is configured to terminate the executed programs corresponding to the executed program objects depending on a detection of the sensor.

10. The device according to claim 1, further comprising a button,
wherein the controller is configured to terminate the executed programs corresponding to the executed program objects upon a press of the button.

11. The device according to claim 1, wherein
the gesture with respect to at least two of the plurality of executed program objects is a flick gesture in a direction to a further object displayed on the touch screen display.

12. The device according to claim 1, wherein
the controller is configured to simultaneously terminate the first, second, and third executed programs corresponding to the first, second and third executed program objects, respectively, when (i) a gesture including touches on the first and second executed program objects but not on the third executed program object is detected through the touch screen display and (ii) the first, second, and third executed program objects are erased.

13. The device according to claim 1, wherein, when a single gesture of moving the first executed program object toward a further executed program object in the history list is detected, the controller is configured to (i) deform the second and third executed program objects between the first executed program object and the further executed program object in the history list, (ii) erase the first, second, and third executed program objects from the history list, and (iii) terminate the first, second, and executed third programs corresponding to the first, second, and third executed program objects, respectively.

14. The device according to claim 1, wherein
one of the executed program objects displayed in the first area of the home screen and one of the executed program objects displayed in the history list correspond to a same program, and the executed program object displayed in the history list has a different appearance from the executed program object displayed in the first area of the home screen.

15. The device according to claim 1, wherein the controller is configured to alternately switch between (a) displaying the history list and (b) not displaying the history list, in response to the user's input.

16. The device according to claim 1, wherein the first executed program object is the one corresponding to the leftmost object in the history list.

17. A method of controlling a device including a touch screen display, the method comprising:
storing a table that includes correspondence relationships between a plurality of programs in the device and a plurality of groups;
displaying
a home screen having different first and second areas,
in the first area, a plurality of terminated program objects corresponding to a plurality of terminated programs, and
in the second area, a history list in response to a user's input, the history list including a plurality of executed program objects corresponding to a plurality of executed programs in execution on the touch screen display,
simultaneously terminate the plurality of the executed programs corresponding to the plurality of executed program objects when a gesture with respect to at least two of the plurality of executed program objects in the history list is detected through the touch screen display,
wherein
the plurality of executed program objects corresponding to the plurality of executed programs is displayed by the touch screen display in both the first area of the home screen and the history list,
in the history list, the plurality of executed program objects corresponding to the plurality of executed programs is displayed by the touch screen display in an order reverse to an order in which the plurality of executed program objects were executed,
the plurality of executed program objects comprises first, second and third executed program objects,
in the history list, the third executed program object is displayed by the touch screen display between the first and second executed program objects, and
the method further includes:
when a gesture of moving the first executed program object and the second executed program object in directions approaching each other is detected in the history list through the touch screen display,
when the third executed program does not belong to a specific group among the plurality of groups in the table, (a) simultaneously terminating first, second, and third programs corresponding to the first, second and third executed program objects, respectively, and (b) erasing the first, second, and third executed program objects from the touch screen display, and
when the third executed program belongs to the specific group among the plurality of groups in the table, (i) simultaneously terminating first and second programs, but maintaining the third program in execution, and (ii) erasing the first and second executed program objects from the history list, but keeping displaying the third executed program object in the history list,
when an executed program object corresponding to one of the plurality of executed programs except the first executed program is selected from any one of the history list and the first area of the home screen,
resuming the executed program and then moving the executed program object corresponding to the resumed program from an initial position in the history list to a left side of the first executed program object in the history list, and
when one of the plurality of terminated programs is selected from the first area of the home screen,
executing and then adding a new executed program object corresponding to the executed program to the history list at the left side of the first executed program object in the history list.

18. A non-transitory storage medium that stores a program for causing, when executed by a device including a touch screen display, the device to execute:
storing a table that includes correspondence relationships between a plurality of programs in the device and a plurality of groups;
displaying
a home screen having different first and second areas,
in the first area, a plurality of terminated program objects corresponding to a plurality of terminated programs, and
in the second area, a history list in response to a user's input, the history list including a plurality of executed program objects corresponding to a plurality of executed programs in execution on the touch screen display,
simultaneously terminate the plurality of the executed programs corresponding to the plurality of executed program objects when a gesture with respect to at least two of the plurality of executed program objects in the history list is detected through the touch screen display,
wherein
the plurality of executed program objects corresponding to the plurality of executed programs is displayed by the touch screen display in both the first area of the home screen and the history list,
in the history list, the plurality of executed program objects corresponding to the plurality of executed programs is displayed by the touch screen display in an order reverse to an order in which the plurality of executed program objects were executed,
the plurality of executed program objects comprises first, second and third executed program objects,
in the history list, the third executed program object is displayed by the touch screen display between the first and second executed program objects, and
the device is further caused by the program to execute:
when a gesture of moving the first executed program object and the second executed program object in directions approaching each other is detected in the history list through the touch screen display,
when the third executed program does not belong to a specific group among the plurality of groups in the table, (a) simultaneously terminating first, second, and third programs corresponding to the first, second and third executed program objects, respectively, and (b) erasing the first, second, and third executed program objects from the touch screen display, and
when the third executed program belongs to the specific group among the plurality of groups in the table, (i) simultaneously terminating first and second programs, but maintaining the third program in execution, and (ii) erasing the first and second executed program objects from the history list, but keeping displaying the third executed program object in the history list, when an executed program object corresponding to one of the plurality of executed programs except the first executed program is selected from any one of the history list and the first area of the home screen, resuming the executed program and then moving the executed program object corresponding to the resumed program from an initial position in the history list to a left side of the first executed program object in the history list, and when one of the plurality of terminated programs is selected from the first area of the home screen, executing and then adding a new executed program object corresponding to the executed program to the history list at the left side of the first executed program object in the history list.

19. A device, comprising:

a storage configured to store a table that includes correspondence relationships between a plurality of programs in the device and a plurality of groups, wherein the plurality of the programs include a plurality of terminated programs and a plurality of executed programs;

a touch screen display configured to display
a home screen having different first and second areas,
in the first area, a plurality of terminated program objects corresponding to the plurality of terminated programs, and
in the second area, a history list in response to a user's input, the history list including a plurality of executed program objects corresponding to the plurality of executed programs in execution; and a controller configured to erase one of the executed program objects from the history list when a flick gesture with respect to the one executed program object is detected through the touch screen display in the history list, wherein
the touch screen display is configured to display first, second, and third executed program objects corresponding to first, second, and third executed programs in both the first area of the home screen and the history list, the touch screen display is configured to display, in the history list, the plurality of executed program objects corresponding to the plurality of executed programs in an order reverse to an order in which the plurality of executed program objects were executed, when the controller detects, through the touch screen display, that a first touch and a second touch approach each other and a distance between the first touch and the second touch becomes smaller than a predetermined threshold value in a state where the first touch is in contact with the first executed program object in the history list and the second touch is in contact with the second executed program object in the history list, when the third executed program does not belong to a specific group among the plurality of groups in the table, the controller is configured to (i) erase the first executed program object, the second executed program object and the third executed program object from the history list, wherein the third executed program object is arranged between the first executed program object and the second executed program object in the history list, and (ii) terminate the first, second, and third executed programs corresponding to the first executed program object, the second executed program object and the third executed program object, and when the third executed program belongs to the specific group among the plurality of groups in the table, the controller is configured to (a) simultaneously terminate first and second executed programs, but maintain the third executed program in execution, and (b) erase the first and second executed program objects from the history list, but keep displaying the third executed program object in the history list, when an executed program object corresponding to one of the plurality of executed programs except the first executed program is selected from any one of the history list and the first area of the home screen, the controller is configured to resume the executed program object and then move the executed program object corresponding to the resumed program from an initial position in the history list to a left side of the first executed program object in the history list, and when one of the plurality of terminated programs is selected from the first area of the home screen, the controller is configured to execute and then add a new executed program object corresponding to the executed program to the history list at the left side of the first executed program object in the history list.

20. The device according to claim 19, wherein
the controller is configured to erase one of the executed program objects from the history list when the flick gesture, a direction of which is different from a direction in which the plurality of executed program objects is scrolled in the history list, with respect to the one executed program object is detected through the touch screen display.

21. A method of controlling a device including a touch screen display, the control method comprising:

storing a table that includes correspondence relationships between a plurality of programs in the device and a plurality of groups, wherein the plurality of the programs include a plurality of terminated programs and a plurality of executed programs; and displaying
a home screen having different first and second areas,
in the first area, a plurality of terminated program objects corresponding to the plurality of terminated programs, and
in the second area, a history list in response to a user's input, the history list including a plurality of executed program objects corresponding to the plurality of executed programs in execution, wherein
first, second, and third executed program objects corresponding to first, second, and third executed programs are displayed in both the first area of the home screen and the history list, and the plurality of executed program objects corresponding to the plurality of executed programs are displayed in an order reverse to an order in which the plurality of executed program objects were executed;

erasing one of the executed program objects from the history list when a flick gesture with respect to the one executed program object is detected through the touch screen display in the history list; and upon detecting, through the touch screen display, that a first touch and a second touch approach each other and a distance between the first touch and the second touch becomes smaller than a predetermined threshold value in a state where the first touch is in contact with the first executed program object in the history list and the second touch is in contact with the second executed program object in the history list,
- when the third executed program does not belong to a specific group among the plurality of groups in the table,
  - (i) erasing the first executed program object, the second executed program object and the third executed program object from the history list, the third executed program object is arranged between the first executed program object and the second executed program object, and
  - (ii) terminating the first, second, and third executed programs corresponding to the first executed program object, the second executed program object and the third executed program object, and
- when the third executed program belongs to the specific group among the plurality of groups in the table,
  - (a) simultaneously terminating first and second executed programs, but maintaining the third executed program in execution, and
  - (b) erasing the first and second executed program objects from the history list, but keeping displaying the third executed program object in the history list,
- when an executed program object corresponding to one of the plurality of executed programs except the first executed program is selected from any one of the history list and the first area of the home screen,
  - resuming the executed program object and then moving the executed program object corresponding to the resumed program from an initial position in the history list to a left side of the first executed program object in the history list, and
- when one of the plurality of terminated programs is selected from the first area of the home screen,
  - executing and then adding a new executed program object corresponding to the executed program to the history list at the left side of the first executed program object in the history list.

22. A non-transitory storage medium that stores a program for causing, when executed by a device including a touch screen display, the device to execute:
- storing a table that includes correspondence relationships between a plurality of programs in the device and a plurality of groups, wherein the plurality of the programs include a plurality of terminated programs and a plurality of executed programs; and
- displaying
  - a home screen having different first and second areas,
    - in the first area, a plurality of terminated program objects corresponding to the plurality of terminated programs, and
    - in the second area, a history list in response to a user's input, the history list including a plurality of executed program objects corresponding to the plurality of executed programs in execution,
- wherein
  - first, second, and third executed program objects corresponding to first, second, and third executed programs are displayed in both the first area of the home screen and the history list, and
  - the plurality of executed program objects corresponding to the plurality of executed programs are displayed in an order reverse to an order in which the plurality of executed program objects were executed;
- erasing one of the executed program objects from the history list when a flick gesture with respect to the one executed program object is detected through the touch screen display in the history list; and
- upon detecting, through the touch screen display, that a first touch and a second touch approach each other and a distance between the first touch and the second touch becomes smaller than a predetermined threshold value in a state where the first touch is in contact with the first executed program object in the history list and the second touch is in contact with the second executed program object in the history list,
  - when the third executed program does not belong to a specific group among the plurality of groups in the table,
    - (i) erasing the first executed program object, the second executed program object and the third executed program object from the history list, the third executed program object is arranged between the first executed program object and the second executed program object, and
    - (ii) terminating the first, second, and third executed programs corresponding to the first executed program object, the second executed program object and the third executed program object, and
  - when the third executed program belongs to the specific group among the plurality of groups in the table,
    - (a) simultaneously terminating first and second executed programs, but maintaining the third executed program in execution, and
    - (b) erasing the first and second executed program objects from the history list, but keeping displaying the third executed program object in the history list,
  - when an executed program object corresponding to one of the plurality of executed programs except the first executed program is selected from any one of the history list and the first area of the home screen,
    - resuming the executed program object and then moving the executed program object corresponding to the resumed program from an initial position in the history list to a left side of the first executed program object in the history list, and
  - when one of the plurality of terminated programs is selected from the first area of the home screen,
    - executing and then adding a new executed program object corresponding to the executed program to the history list at the left side of the first executed program object in the history list.

* * * * *